United States Patent
Judd et al.

(10) Patent No.: US 10,297,280 B1
(45) Date of Patent: May 21, 2019

(54) COMPENSATION FOR NONLINEARITY IN SERVO PATTERNS

(71) Applicant: International Business Machines Corporation, Armonk, NY (US)

(72) Inventors: Kevin B. Judd, Tucson, AZ (US); Simeon Furrer, Altdorf (CH); Angeliki Pantazi, Thalwil (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/044,407

(22) Filed: Jul. 24, 2018

(51) Int. Cl.
  *G11B 5/596* (2006.01)
  *G11B 5/56* (2006.01)
  *G11B 5/008* (2006.01)
  *G11B 5/55* (2006.01)
  *G11B 5/584* (2006.01)

(52) U.S. Cl.
  CPC .......... *G11B 5/56* (2013.01); *G11B 5/00873* (2013.01); *G11B 5/5543* (2013.01); *G11B 5/584* (2013.01)

(58) Field of Classification Search
  CPC ..... G11B 5/54; G11B 5/59627; G11B 5/5965; G11B 5/59688; G11B 5/59633; G11B 5/584; G11B 5/588
  USPC ... 360/75, 77.04, 77.06, 77.07, 77.05, 77.12
  See application file for complete search history.

(56) References Cited

U.S. PATENT DOCUMENTS

| | | | |
|---|---|---|---|
| 5,825,579 A * | 10/1998 | Cheung | G11B 5/5552 360/77.08 |
| 6,690,535 B2 | 2/2004 | Wang | |
| 7,411,759 B2 | 8/2008 | Trabert et al. | |
| 7,502,197 B1 | 3/2009 | Chue | |
| 8,089,716 B2 | 1/2012 | Takayama et al. | |
| 8,270,108 B2 | 9/2012 | Harper et al. | |
| 8,902,537 B1 | 12/2014 | Biskeborn et al. | |
| 8,982,493 B2 | 3/2015 | Underkofler | |
| 9,324,350 B2 | 4/2016 | Biskebom et al. | |
| 9,542,966 B1 | 1/2017 | Zheng et al. | |

(Continued)

FOREIGN PATENT DOCUMENTS

WO    0175874 A2    10/2001

OTHER PUBLICATIONS

Notice of Allowance from U.S. Appl. No. 16/044,396, dated Dec. 27, 2018.

(Continued)

*Primary Examiner* — Nabil Z Hindi
(74) *Attorney, Agent, or Firm* — Zilka-Kotab, P.C.

(57) ABSTRACT

A method according to one embodiment includes generating a y-position estimate based on a servo readback signal from a servo reader reading a servo band, retrieving or calculating a nonlinearity-correction value corresponding to the y-position estimate, adjusting the y-position estimate using the nonlinearity-correction value, and outputting the adjusted y-position estimate. A computer program product for compensating for nonlinearity in a timing based servo pattern according to one embodiment includes a computer readable storage medium having program instructions embodied therewith. The computer readable storage medium is not a transitory signal per se. The program instructions are readable and/or executable by a controller to cause the controller to perform the foregoing method.

20 Claims, 21 Drawing Sheets

(56) References Cited

U.S. PATENT DOCUMENTS

| | | |
|---|---|---|
| 9,837,110 B1 | 12/2017 | Oberg et al. |
| 9,911,442 B1 | 3/2018 | Kharisov et al. |
| 2008/0144211 A1 | 6/2008 | Weber et al. |
| 2009/0109563 A1 | 4/2009 | Handa et al. |
| 2012/0033317 A1 | 2/2012 | Szita |

OTHER PUBLICATIONS

Judd et al., U.S. Appl. No. 16/044,396, filed Jul. 24, 2018.
List of IBM Patents or Patent Applications Treated as Related.
Cherubini et al., "Feedback control of transport systems in tape drives without tension transducers," Mechatronics, vol. 49, 2018, pp. 211-223.
Cherubini et al., "Control Methods in Data-Storage Systems," IEEE Transactions on Control Systems Technology, vol. 20, No. 2, Mar. 2012, pp. 296-322.
Ultrium LTO, "Your LTO-8 Questions. Answered." 2018, 5 pages retrieved from http://www.lto.org/.
Cherubini et al., "High-Performance Servo Channel for Nanometer Head Positioning and Longitudinal Position Symbol Detection in Tape Systems," IEEE/ASME Trans. on Mechatronics, vol. 21, No. 2, Apr. 2016, pp. 1116-1128.
Judd et al., U.S. Appl. No. 16/290,758, filed Mar. 1, 2019.
Notice of Allowance from U.S. Appl. No. 16/044,396, dated Mar. 15, 2019.

\* cited by examiner

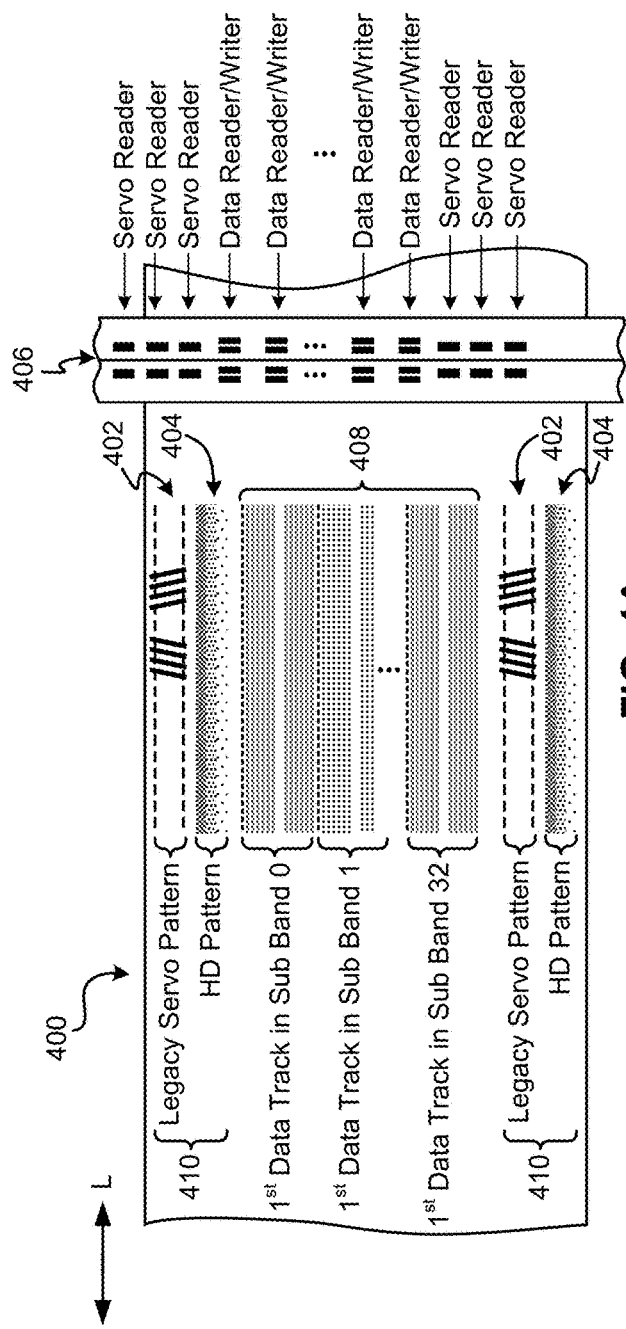
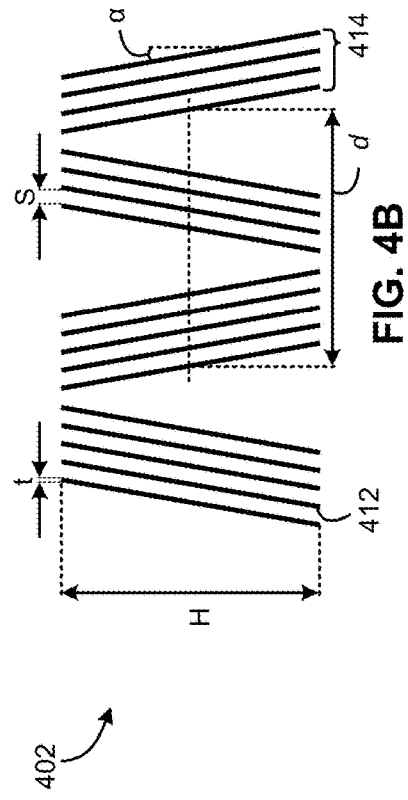
FIG. 4A
FIG. 4B

COMPENSATION FOR NONLINEARITY IN SERVO PATTERNS

BACKGROUND

The present invention relates to tape storage systems, and more specifically, to compensating for characterized nonlinearity in servo patterns.

Timing based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which runs about parallel to a longitudinal axis of the tape. Data is recorded in the regions of tape located between pairs of the servo bands. In read/write heads of linear tape-open (LTO) and IBM Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, accurately controlling the lateral position of the head and/or skew of the head with respect to tape by using feedback generated by reading the TBS patterns becomes increasingly difficult. Conventional servo-based implementations may not be sufficiently accurate to ensure adequate positioning of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths.

SUMMARY

A method according to one embodiment includes generating a y-position estimate based on a servo readback signal from a servo reader reading a servo band, retrieving or calculating a nonlinearity-correction value corresponding to the y-position estimate, adjusting the y-position estimate using the nonlinearity-correction value, and outputting the adjusted y-position estimate.

A computer program product for compensating for nonlinearity in a timing based servo pattern according to one embodiment includes a computer readable storage medium having program instructions embodied therewith. The computer readable storage medium is not a transitory signal per se. The program instructions are readable and/or executable by a controller to cause the controller to perform the foregoing method.

An apparatus according to one embodiment includes a controller configured to generate a y-position estimate based on a servo readback signal from a servo reader reading a servo band, retrieve or calculate a nonlinearity-correction value corresponding to the y-position estimate, adjust the y-position estimate using the nonlinearity-correction value, and output the adjusted y-position estimate.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A shows a hybrid servo pattern written in a dedicated area of a tape medium, according to one embodiment.

FIG. 4B shows a partial detailed view of a TBS pattern, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of processes for compensating for nonlinearity in servo patterns, as well as systems and products for performing the processes.

In one general embodiment, a method includes generating a y-position estimate based on a servo readback signal from a servo reader reading a servo band, retrieving or calculating a nonlinearity-correction value corresponding to the y-position estimate, adjusting the y-position estimate using the nonlinearity-correction value, and outputting the adjusted y-position estimate.

In another general embodiment, a computer program product for compensating for nonlinearity in a timing based servo pattern includes a computer readable storage medium having program instructions embodied therewith. The computer readable storage medium is not a transitory signal per se. The program instructions are readable and/or executable by a controller to cause the controller to perform the foregoing method.

In another general embodiment, an apparatus includes a controller configured to generate a y-position estimate based on a servo readback signal from a servo reader reading a servo band, retrieve or calculate a nonlinearity-correction value corresponding to the y-position estimate, adjust the y-position estimate using the nonlinearity-correction value, and output the adjusted y-position estimate.

Figure 1:
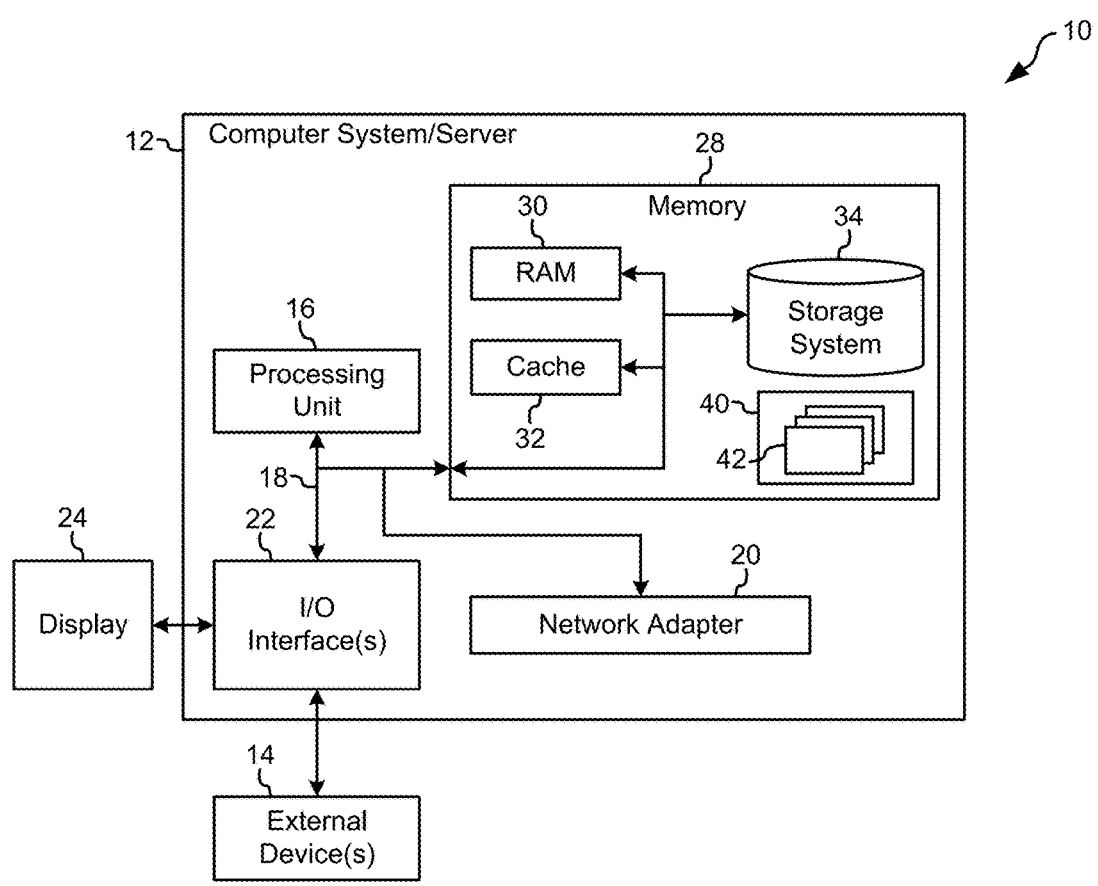
FIG. 1 illustrates a network storage system, according to one embodiment.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disc drive for reading from or writing to a removable, non-volatile optical disc such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
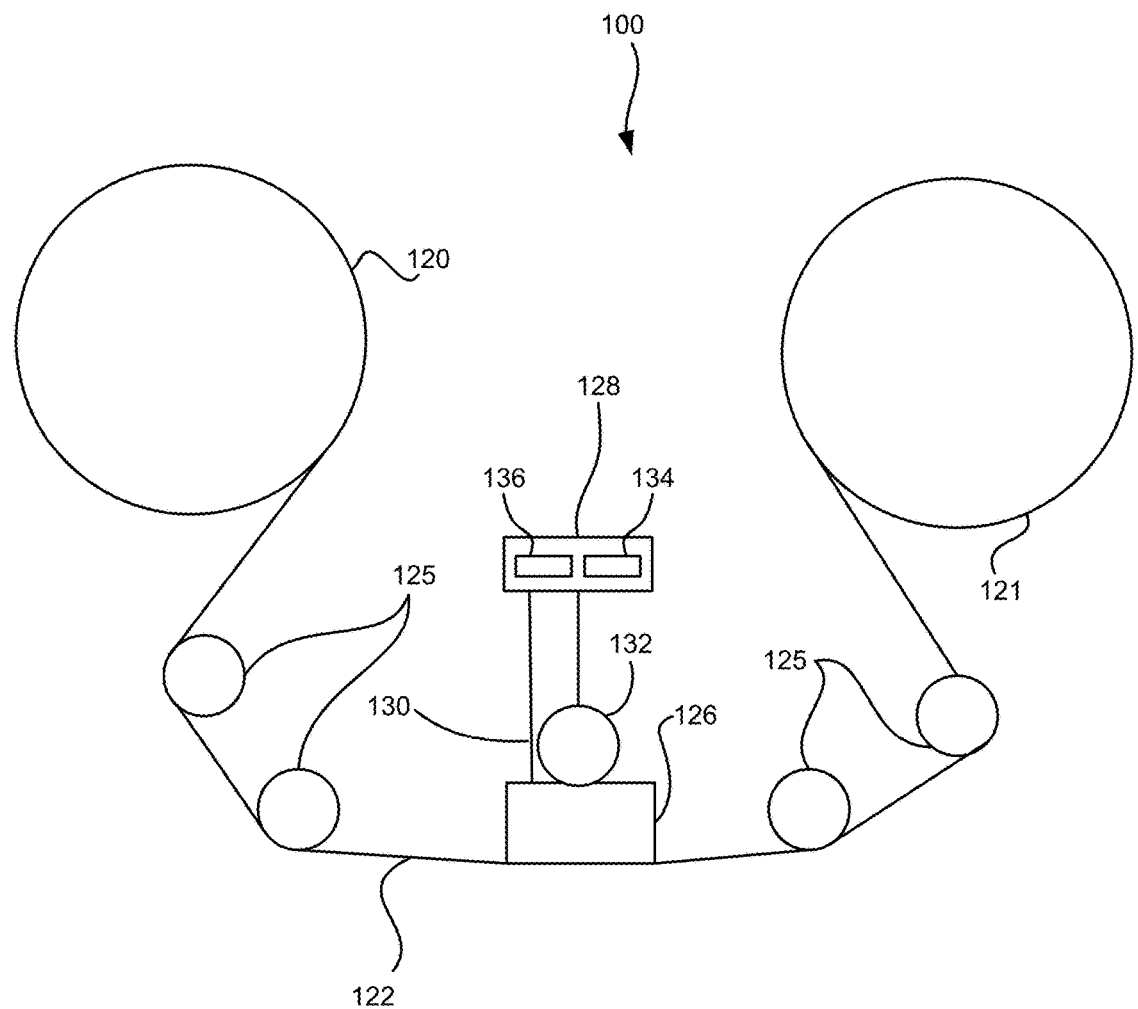
FIG. 2 illustrates a simplified tape drive of a tape-based data storage system, according to one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
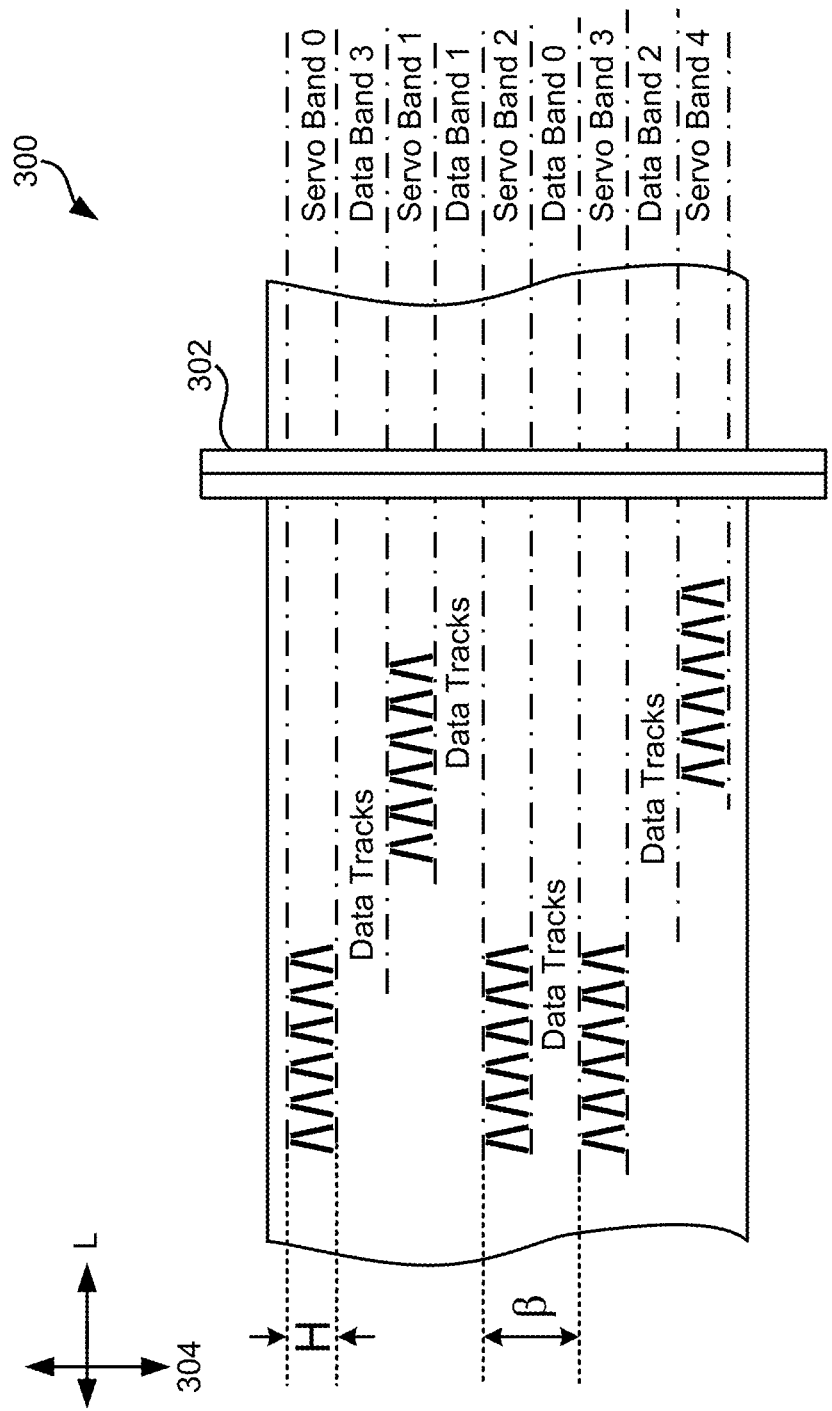
FIG. 3 illustrates a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch β between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS patterns, e.g., as seen in FIG. 3. The HD servo patterns may be used to improve track-following performance.

In still further embodiments, a standard TBS pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figure 11A:
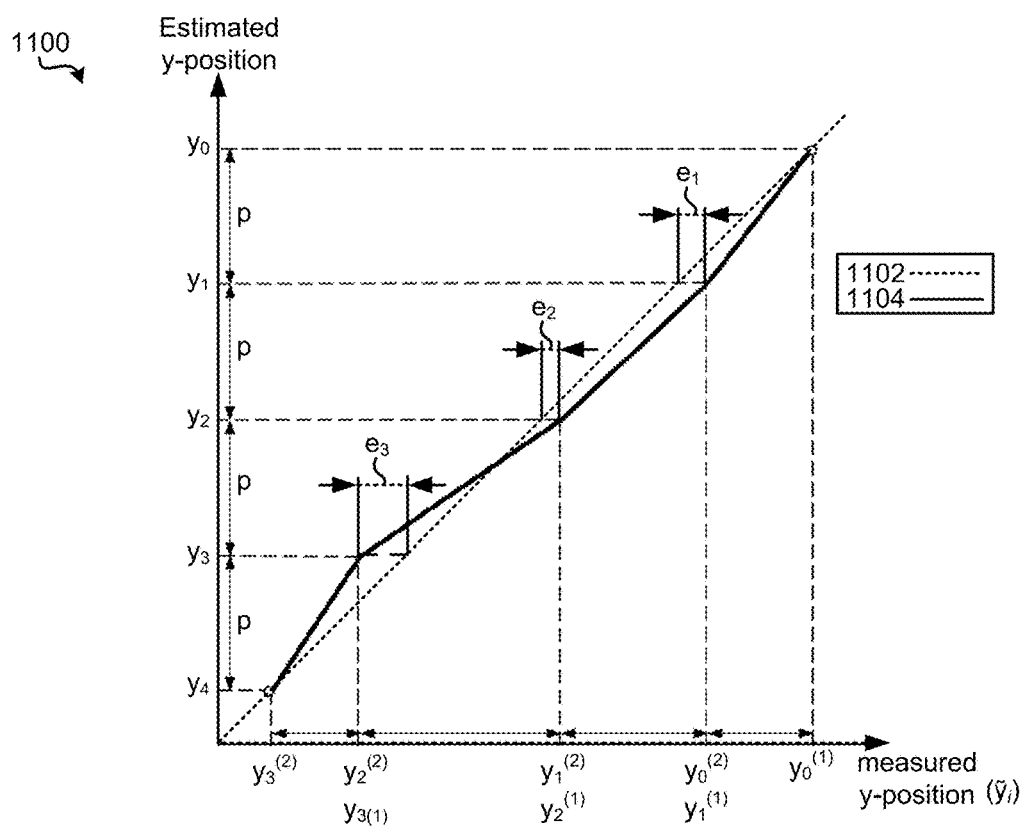
FIG. 11A shows a graph plotting measured y-positions vs. linearized y-positions, according to one embodiment.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform, e.g., as seen in FIGS. 5A, 5C and 11A below. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. Accordingly, the depicted TBS frame has four servo bursts 414 and two servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle $\alpha$. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 µm, and the angle $\alpha$ may be about 6°, while the thickness t is about 2.1 µm. Moreover, the spacing S between each of the servo stripes 412 and/or the distance d between servo bursts 414 having the same azimuthal slope may vary depending on the desired embodiment. According to an exemplary approach, which is in no way intended to limit the invention, the spacing S may be about 5 µm, while the distance d is about 100 µm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 4C:
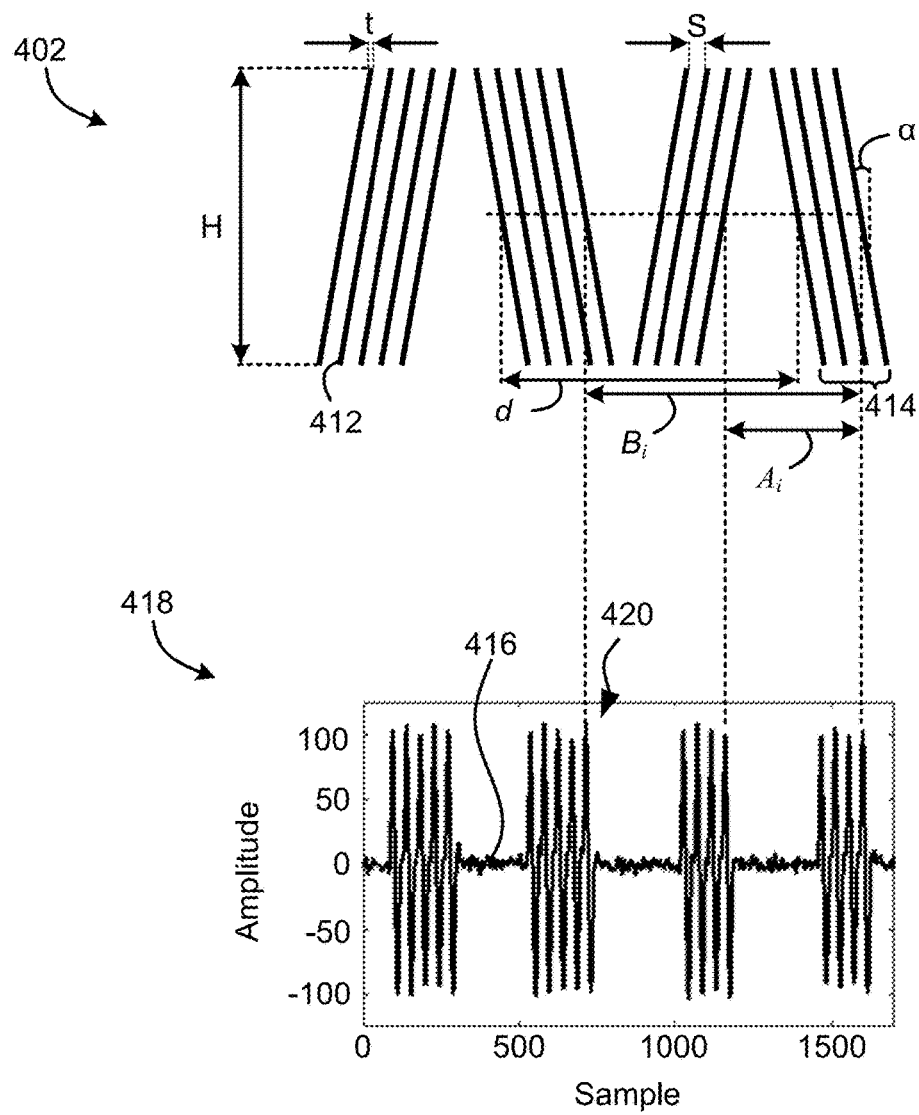
FIG. 4C shows graph plotting sample vs. amplitude of the TBS pattern of FIG. 4B, according to one embodiment.
Figure 5C:
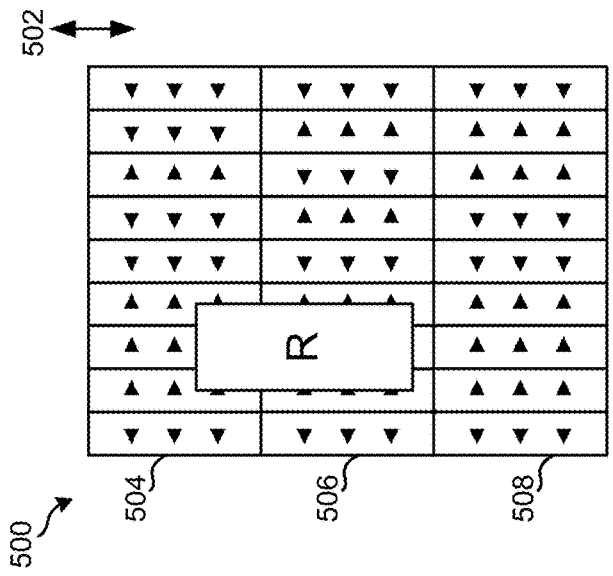
FIG. 5C is a HD pattern, according to one embodiment.

FIG. 4C illustrates a graph 418 plotting sample vs. amplitude of the TBS pattern 402 of FIG. 4B, detected as a servo readback signal 416 during readback. A servo channel may decode the readback signal that is received from a servo reader of a magnetic tape head reading the TBS pattern 402. For example, when a servo stripe 412 of the TBS pattern 402 passes across the servo sensor, a double pulse portion 420 (having a positive peak and a negative peak) of the readback signal 416 is generated, e.g., for purposes of an example see lateral dashed lines indicating how double pulse portions of the readback signal 416 correspond to servo stripe read locations. Accordingly, two or more of such double pulse portions and timing associated therewith may be used in calculating lateral position (y-position) estimates.

In one approach, the servo channel may provide y-position estimates to a track-following control system, e.g., where such y-position estimates are calculated using Equation 1 below.

$$\hat{y} = \frac{d}{2\tan(\alpha)}\left(\frac{1}{2} - \frac{\Sigma A_i}{\Sigma B_i}\right) \quad \text{Equation 1}$$

As shown above, the lateral y-position estimate ŷ of Equation 1 may incorporate: the distance d, the azimuthal slope (angle α) of the servo stripes 412, a measured time $B_i$ between pairs of corresponding servo stripes with the same azimuth angle (e.g., parallel stripes //, or \ \) from two different sub-frames, and a measured time $A_i$ between pairs of corresponding servo stripes with opposite azimuth angle (e.g., stripes /\) from the same sub-frame.

For example, in the 5-5-4-4 pattern of FIG. 4C, four measurements $A_i$, i=0, 1, 2, 3 and four measurements of $B_i$, i=0, 1, 2, 3 are performed per servo sub-frame of the TBS pattern 402 of FIG. 4B. In some approaches, the distance d is may be referred to as the "sub-frame length."

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled 'R') spans wider in the cross-track direction 502 than a single track, such that at least two tones/frequencies are detected under any reading conditions at a given time when the servo reader R is overlapped with the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 µm to about 150 µm, such as about 60 µm, about 75 µm, about 100 µm, etc., depending on the approach. Moreover, the symbol length may be in a range from about 0.5 µm to about 3.0 µm, e.g., such as about 1.0 µm, about 1.5 µm, about 2.0 µm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Figure 5D:
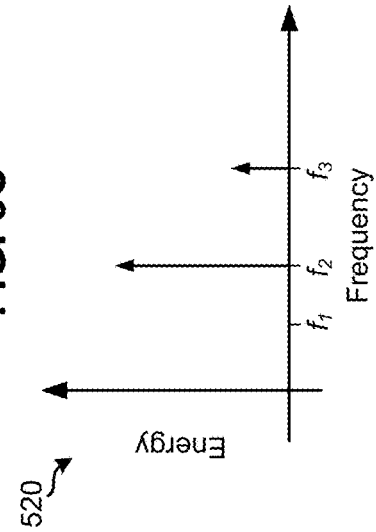
FIG. 5D is a graph plotting readback energy vs. frequency for the reader in FIG. 5C.
Figure 5A:
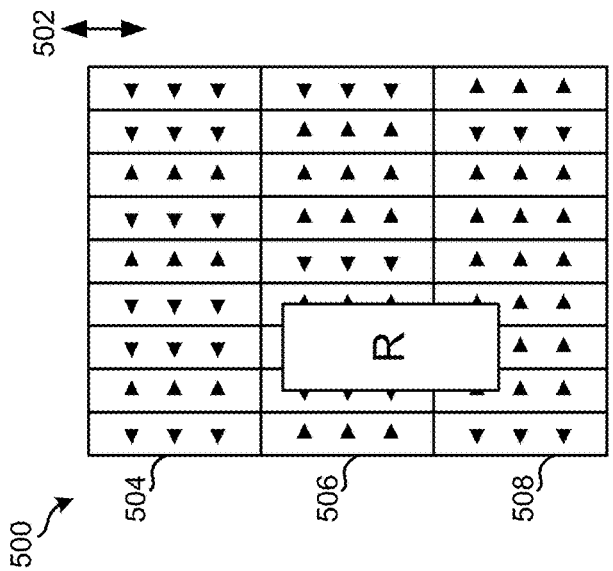
FIG. 5A is a High-Density (HD) pattern, according to one embodiment.
Figure 5B:
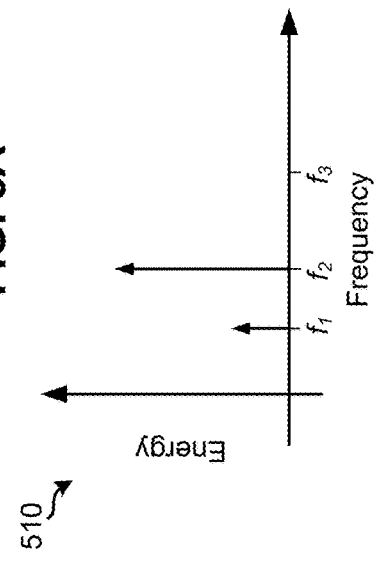
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
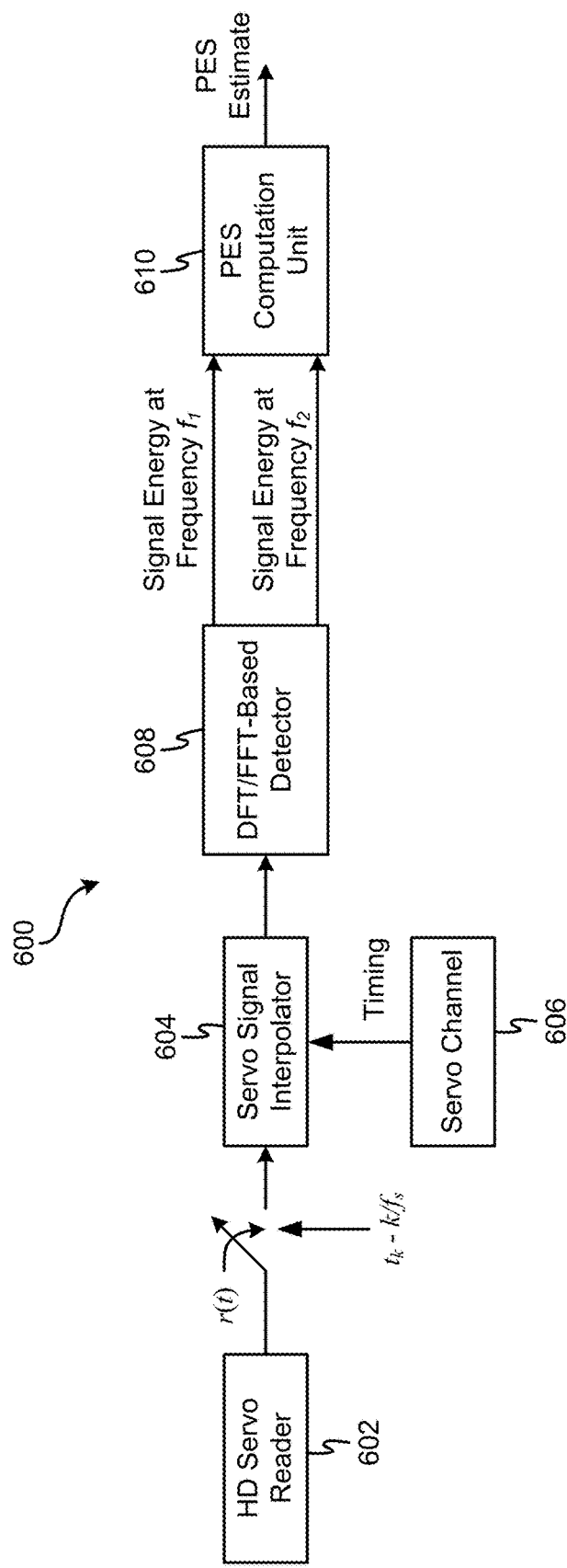
FIG. 6 shows a block diagram of a detector for HD patterns, according to the prior art.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
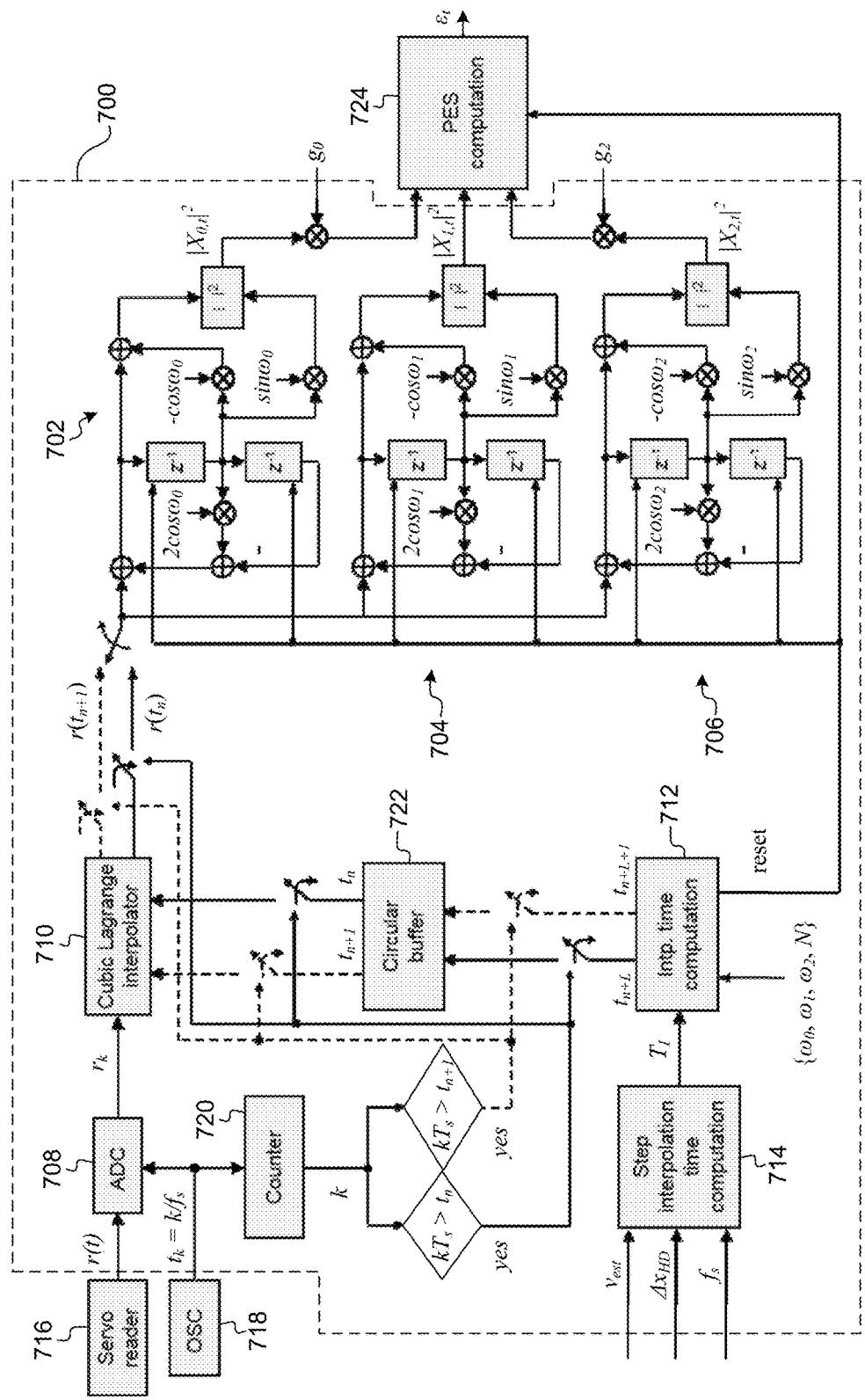
FIG. 7 shows a block diagram of a detector for HD patterns, according to one embodiment.

Now referring to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the analog-to-digital converter (ADC) 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover the frequency $f_s$ of the clock 718 may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied independently of the tape velocity, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_1$ seconds, where $T_1$ denotes the time interval that it takes for the tape to travel over a distance equal to the step interpolation distance $\Delta x_{HD}$. The estimation of the time interval $T_1$ is performed by a step interpolation time computation unit 714, which computes $T_1=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_1/T_s$, where $T_s=1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i=2\pi f_i$ from which the coefficients of the digital filters 702, 704, 706 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

Multiplication of the three energy estimates by gain factors $g_i$, for i=0, 1, 2, is provided to compensate for the different attenuations that the readback HD servo signal may experience at different frequencies, where the normalization $g_1=1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate ($\varepsilon_t$) at given time t.

Other components of the HD detector 700 may operate as would be known to one of skill in the art, and are omitted here for the sake of clarity of the described embodiments.

Linear magnetic tape recording systems often utilize TBS patterns to estimate head lateral position. During tape drive operation, a magneto-resistive servo read transducer in the head scans over the TBS pattern and a readback signal is produced, e.g., see FIG. 4C. A servo channel processes the servo readback signal and measures the time intervals between bursts of stripes/dibits to estimate the tape head lateral position (y-position) relative to the TBS pattern. A position-error signal (PES) is generated by subtracting the estimated head position from the desired lateral position/trajectory and provided to a servo controller. The servo controller, in combination with a current driver and a head actuator, adjusts the position of the head and thereby closes the track-following servo control loop.

The y-position may be estimated from the TBS patterns by measuring the time between the A-burst and B-burst stripes (and between C-burst and D-burst stripes), also termed as A-counts ($A_i$). Specifically, the y-position is linearly dependent on the A-count values ($A_i$), provided that the servo stripes are perfectly "straight". For example, in the 5-5-4-4 servo pattern of FIGS. 4B-4C, the bursts of stripes /////\\\\\/////\\\\ correspond to the A B C D-burst, respectively. i.e., A-burst=/////, B-burst=\\\\\, C-burst=////, D-burst=\\\\.

However, servo stripes that are factory pre-formatted on tape cartridges are often not perfectly "straight", e.g. due to manufacturing imperfections or defects in the servo writer. This leads to a non-linear relationship between measured y-positions, e.g., based on $A_i$ measurements (see FIG. 4C), and actual (true) y-positions of the head.

Figure 8:
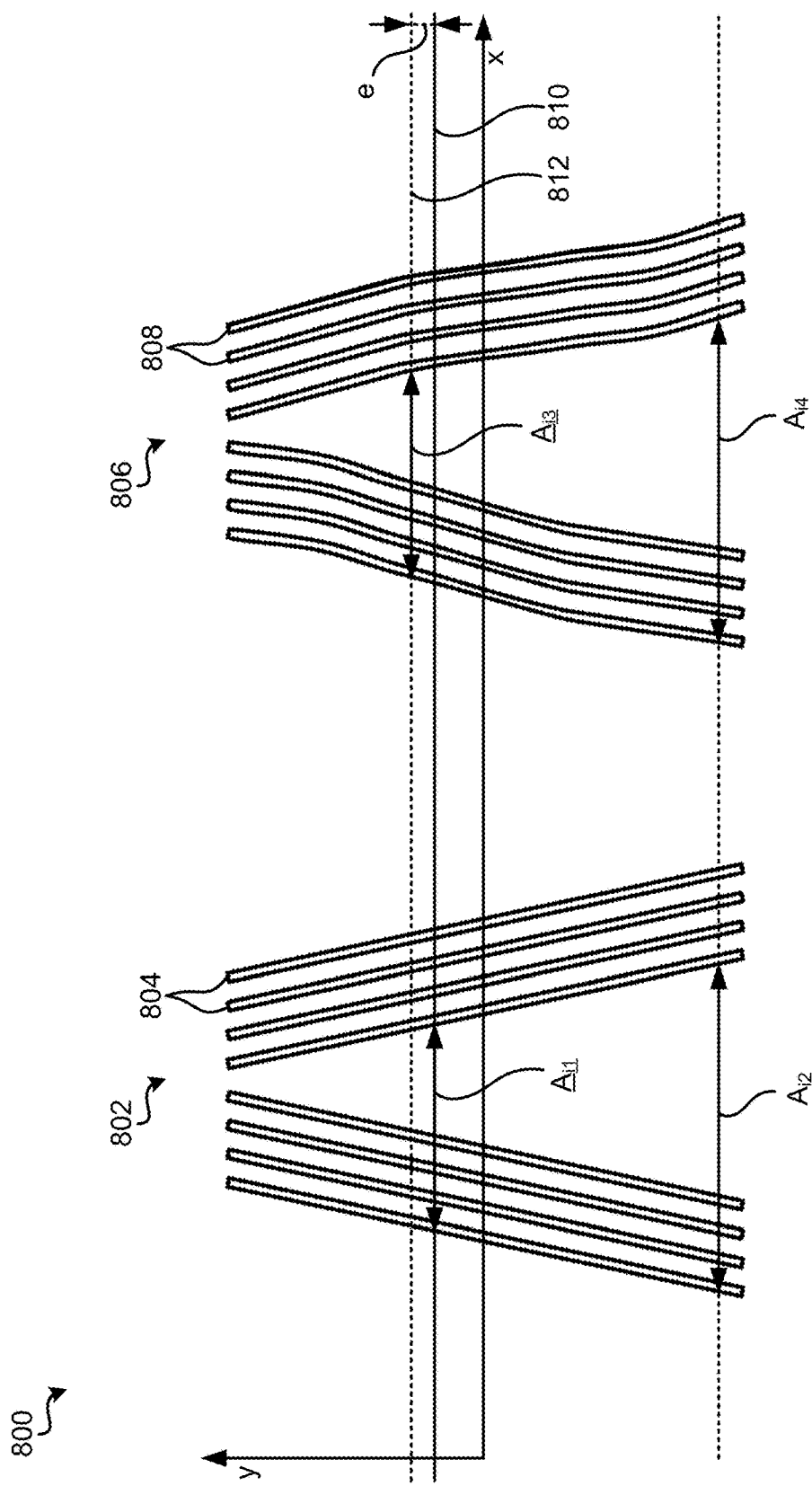
FIG. 8 shows a first TBS pattern with linear servo bands, and a second TBS pattern with nonlinear servo bands, according to one embodiment.

For example, referring to FIG. 8, representation 800 includes two TBS patterns 802, 806. The TBS pattern 802 is a linear pattern, with linear servo stripes 804. In some approaches, a TBS pattern may be characterized as being "linear" or "straight" if A-count distances $A_{i1}$, $A_{i2}$ of the TBS pattern 802 linearly increase as a function of the (y)-position of the intended trajectory of the servo reader. For example, the stripes 804 of the TBS pattern 802 appear relatively linear/straight.

In contrast, where A-count distances of a TBS pattern do not linearly increase as a function of the (y)-position of the intended trajectory of the servo reader, the TBS pattern may be characterized as being a nonlinear "curved" TBS pattern. For example, see nonlinear stripes 808 of the TBS pattern 806, which will result in the A-count distances $A_{i3}$, $A_{i4}$ not linearly increasing as a function of the (y)-position of the intended trajectory of the servo reader. Accordingly, non-linear TBS patterns may cause a data track to be written slightly offset (in cross-track direction) from the desired location. The nonlinearity in the TBS patterns therefore may cause some tracks to be wider or narrower than the nominal/desired width, which leads to more variability/degraded performance when the data is read from magnetic tape. This is because measured A-count distances will not entirely accurately reflect the relative position of the head with respect to servo bands and/or data bands. As a result of such nonlinearities, data written to data tracks of the magnetic tape may be compressed or spaced too far apart. Accordingly, as a result of the TBS pattern 806 being nonlinear (up to a nanometer degree), a y-position dependent error e may result. Specifically, the y-position dependent error e may result from a difference existing between an average measured y-position 810 and an actual (true) y-position 812. Note that in FIG. 8, in one approach, it may be assumed that $A_{i1}=A_{i3}$. Moreover, assuming that the true reader position is position 812, then based on the measured $A_{i3}$ ($=A_{i1}$), and assuming that the servo pattern is linear, the "measured" y-position is y-position 810.

In various approaches, for each servo band/pattern, the intention is to determine the y-position dependent error e, such that an estimate of the actual (true) y-position, which is referred to as linearized y-position, can be computed by subtracting the y-position dependent error e from the measured y-position.

Various embodiments described herein characterize the nonlinearity in servo patterns. According to various embodiments, such nonlinearity characterizations are calculated and thereafter stored and/or used for compensating for such nonlinearities, as will become apparent from reading various descriptions herein.

It should be noted that such characterizations may be made on any type of servo patterns, although many of the embodiments and/or approaches described herein may specifically reference TBS patters. For example, in addition and/or as an alternative to TBS patterns, embodiments and/or approaches described herein may be applied to HD servo patterns (see FIGS. 5A-5D).

Figure 9:
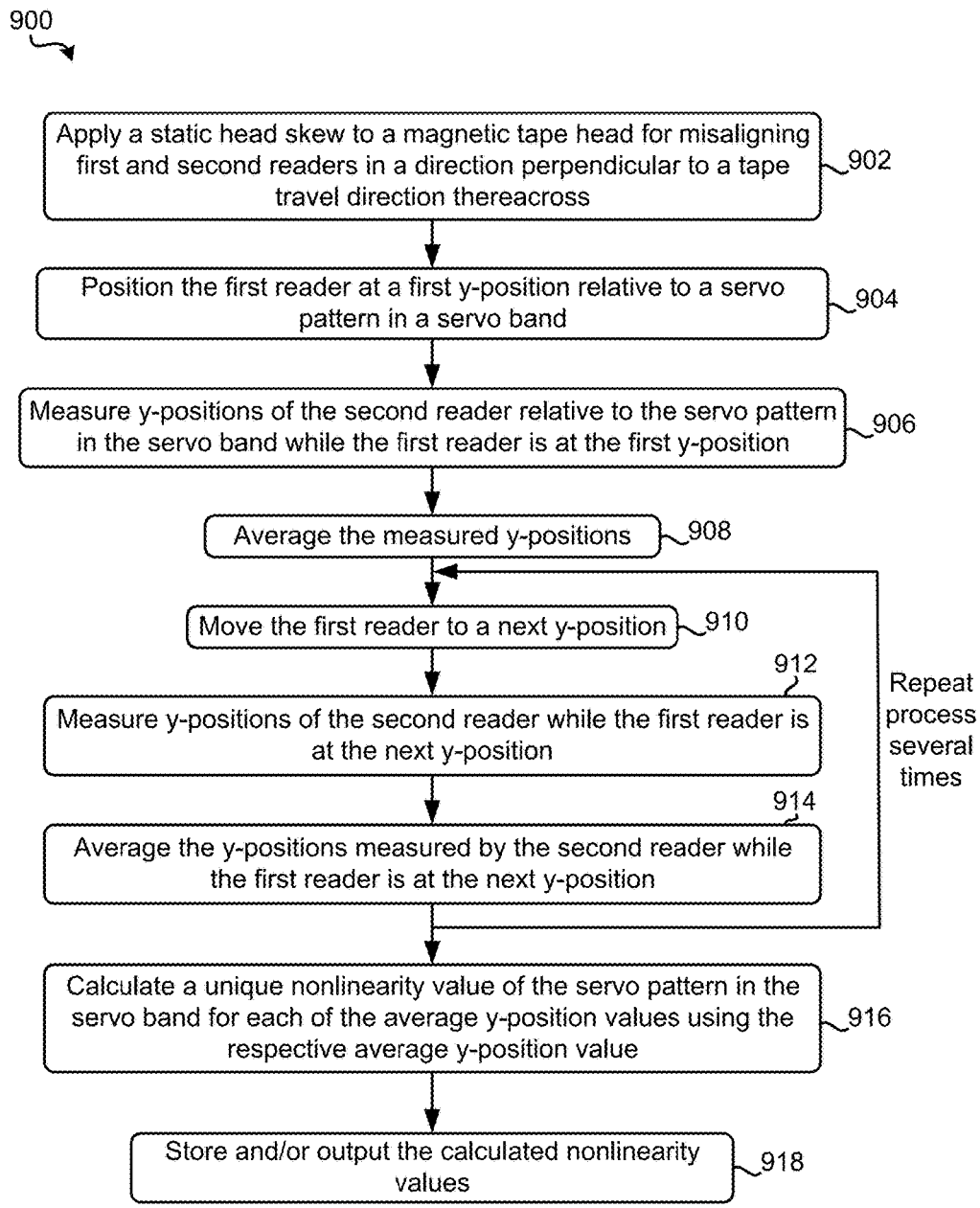
FIG. 9 shows a flowchart of a method, according to one embodiment.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a drive controller, a host coupled to a drive, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 includes operation 902, where a static head skew is applied to a magnetic tape head for misaligning first and second readers in a direction perpendicular to a tape travel direction, e.g., direction of a magnetic recording tape thereacross. It should be noted that the amount of head skew applied to the magnetic tape head may depend on the approach, as would become apparent to one of ordinary skill in the art upon reading the descriptions of various embodiments and/or approaches herein. As noted above, the head skew is static, i.e., the skew angle does not change during performance of the method. Note that changing the head skew during performance of the method and applying a factor to compensate for the changed skew angle should be considered equivalent.

According to one approach, the static head skew is applied to the magnetic tape head by an actuator. Accordingly, operation 902 may include instructing a skew actuator.

It should be noted that method 900 may be performed during any one or more directions of tape travel, e.g., in a single direction of tape travel, such as forward (beginning of tape to end of tape), or backward (end of tape to beginning of tape); or in both directions of tape travel, such as forward and backward. However, in preferred approaches, method 900 is performed with the tape traveling in a single direction.

Operation 904 of method 900 includes positioning the first reader at a first y-position relative to a servo pattern in a servo band. As mentioned elsewhere herein, the servo pattern may be any type of servo pattern. According to some approaches, the servo pattern is a TBS pattern that comprises bursts of servo stripes. According to some other approaches, the servo pattern is a HD servo pattern containing multiple HD tracks having a repeating periodic waveform.

The first y-position may be any position relative to a servo pattern in a servo band of the magnetic tape. In a preferred approach, the first y-position is located toward an outermost lateral portion of the servo pattern in a servo band of the magnetic tape. The first y-position may be predefined, selected on the fly, etc.

Operation 906 of method 900 includes measuring y-positions of the second reader relative to the servo pattern in the servo band while the first reader is at the first y-position, e.g., while the first reader is locked to and track follows at the first y-position while the tape is moving over the magnetic tape head. Any number of y-positions of the second reader may be measured, e.g., according to some predefined criteria. For example, according to various approaches, a y-position may be computed, e.g., for each servo frame, for every other frame, for every $5^{th}$ frame, etc.

In one approach, some or all of the measured y-positions are at least temporarily stored in memory, e.g., to be subsequently used in any type of calculating.

In one approach, some or all of the measured y-positions of the second reader are averaged, e.g., see operation 908. In one approach, the y-positions are averaged each time a y-position measurement is performed by the second reader, while the first reader is at the first y-position. In another approach, the y-positions are averaged after all of the y-position measurements are performed by the second reader at the current y-position. In yet another approach, a subset of the measured y-positions are selected for averaging based on predefined criteria such as every other measured y-position, every $5^{th}$ measured y-position, y-position values within a range e.g., to exclude outliers, etc.

Operation 910 includes moving the first reader to a next y-position, e.g., for performing further y-position measurements at a different y-position than the immediately previous y-position.

In one approach, the next y-position corresponds to an average y-position of the second reader during the immediately previous measuring. Accordingly, in such an approach, a distance between the next y-position and the average y-position of the second reader during the immediately previous measuring may about equal the distance between the first and second readers in a direction perpendicular to the tape travel direction thereacross.

In another approach, the next y-position corresponds to a predefined step size away from the y-position of the first reader during the immediately previous measuring. In various approaches, the predefined step may include any distance. In some approaches, the predefined step is less than or equal to the distance between the first and second readers in a direction perpendicular to the tape travel direction thereacross. In other approaches, the predefined step is greater the distance between the first and second readers in a direction perpendicular to the tape travel direction thereacross.

In one approach, after the first reader is moved to the next y-position, y-positions of the second reader while the first reader is at the next y-position are measured in operation 912, e.g., in a similar manner as performed in operation 906.

In another approach, the y-positions measured by the second reader while the first reader is at the next y-position are averaged in operation 914, e.g., in a similar manner as performed in operation 908.

It should be noted that the process defined by operations 910-914 may be performed any number of times, and preferably several times, e.g., see "Repeat process several times" logic exiting operation 914 and looping back to operation 910. Performing more iterations tends to result in a more accurate nonlinearity characterization of the measured servo patterns of the servo band, as will become apparent in operation 916. In one approach, the process (operations 910-914) stops when an end of the servo band is reached. For example, in one approach, upon detecting that the next y-position resides on an outermost portion of the servo band and/or off of the servo band, the process stops. Accordingly, the y-position measurements may correlate to different y-positions across the entire servo band, e.g., from the first position of the second reader to the last position of the second reader (where the process ends).

Operation 916 includes calculating a unique nonlinearity value of the servo pattern in the servo band for each of the average y-position values using the respective average y-position value.

In one approach, calculating a unique nonlinearity value of the servo pattern in the servo band for each of the average y-position values includes calculating a difference between the average y-position values and linearized y-positions. To clarify, in some approaches, the "average y-position" corresponds to an (average) measured y-position, i.e. the y-position based on measured $A_i$ counts and computed by means of Equation 1, which assumes a linear servo pattern. In such an approach, the linearized y-positions corresponds to where the y-position is expected to be. Accordingly, y-positions having a relatively greater difference between an average y-position value and a linearized y-positions may be assumed to correspond to and thereby contribute to greater degrees of nonlinearity in the servo band. In contrast, y-positions having a relatively lesser difference between an average y-position value and a linearized y-positions may be assumed to contribute less, if at all, to nonlinearity in measured servo patters.

In various approaches, the linearized y-positions are calculated based on an assumption of at least two y-positions. In preferred approaches, the at least two y-positions are known and/or assumed to be accurate. For example, in one approach, the linearized y-positions are calculated based on the first y-position and the last average measured y-position. In such an approach the first y-position and the last average measured y-position may serve as anchor points.

Accordingly, in one approach, each of the linearized y-positions correspond to a different position along a linear function that extends between the first y-position and the last average measured y-position, e.g., see FIG. 11A.

Moreover, in some approaches, the calculated unique nonlinearity values are stored and/or output, e.g., see operation 918. According to one approach, the calculated unique nonlinearity values are stored in and/or output to a table of nonlinearity values. According to another approach, the calculated unique nonlinearity values are additionally and/or alternatively stored and/or output to a controller for use in compensating for the calculated nonlinearity of the servo pattern in the servo band, e.g., as will be described elsewhere herein (see FIG. 16).

It should be noted that the number of servo frames used during various operations of method 900 may depend on the amount of tape that is passed by the head during such operations. In some approaches, at least one meter of tape is passed over the head in at least one of the measuring operations. In other approaches, at least fifty meters of tape is passed over the head in at least one of the measuring operations. In yet another approach, at least one hundred meters of tape is passed over the head in at least one of the measuring operations. Accordingly, such measuring operations may be performed using any number of servo frames, e.g., at least one, hundreds, thousands, etc.

It should be noted that the greater the number of incorporated servo frames, the greater the accuracy of characterizing nonlinearity may be. This is because nonlinearities are often on the nanometer scale, and therefore more samples should provide a more accurate reflection of even a nanometer increment of nonlinearity.

It should also be noted that according to various approaches, method 900 may be performed at any time and/or any number of times. For example, in one approach, method 900 is performed on a magnetic tape during manufacturing. In such an approach, the nonlinearity of servo patterns of the magnetic tape are characterized (if any nonlinearity exists) and stored in a memory component of the cartridge that contains the magnetic tape. According to another approach, method 900 is additionally and/or alternatively performed on a magnetic tape, e.g., on demand, upon request from a host or library controller, in response to detecting that the magnetic tape has been loaded in a tape drive, etc. According to yet another approach, method 900 is additionally and/or alternatively performed, e.g., by a tape drive, at any time after the magnetic tape is loaded into the tape drive, e.g., in response to detecting servoing errors.

Accordingly, as a result of characterizing such nonlinearities of servo patterns, writing and/or reading events may utilize such characterizations for mitigating writing and/or readback errors that would otherwise occur in response to treating nonlinear servo patterns as if they were linear. Utilizing such characterizations will be described in detail elsewhere herein, e.g., see FIG. 16.

Figure 10A:
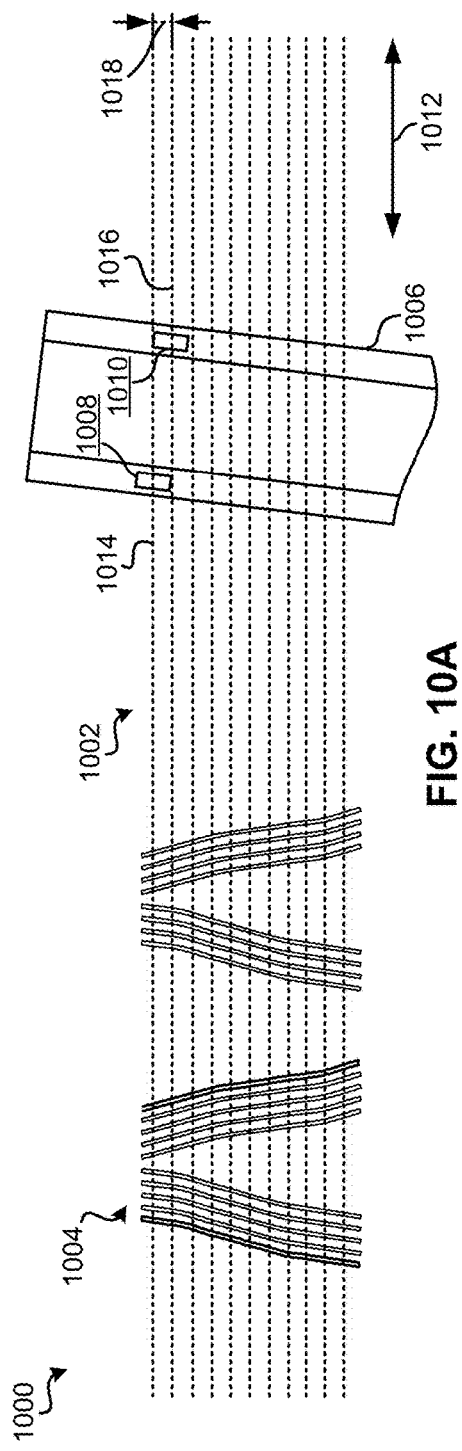
FIG. 10A shows a magnetic tape head in a starting y-position relative to a servo pattern in a servo band, according to one embodiment.
Figure 10B:
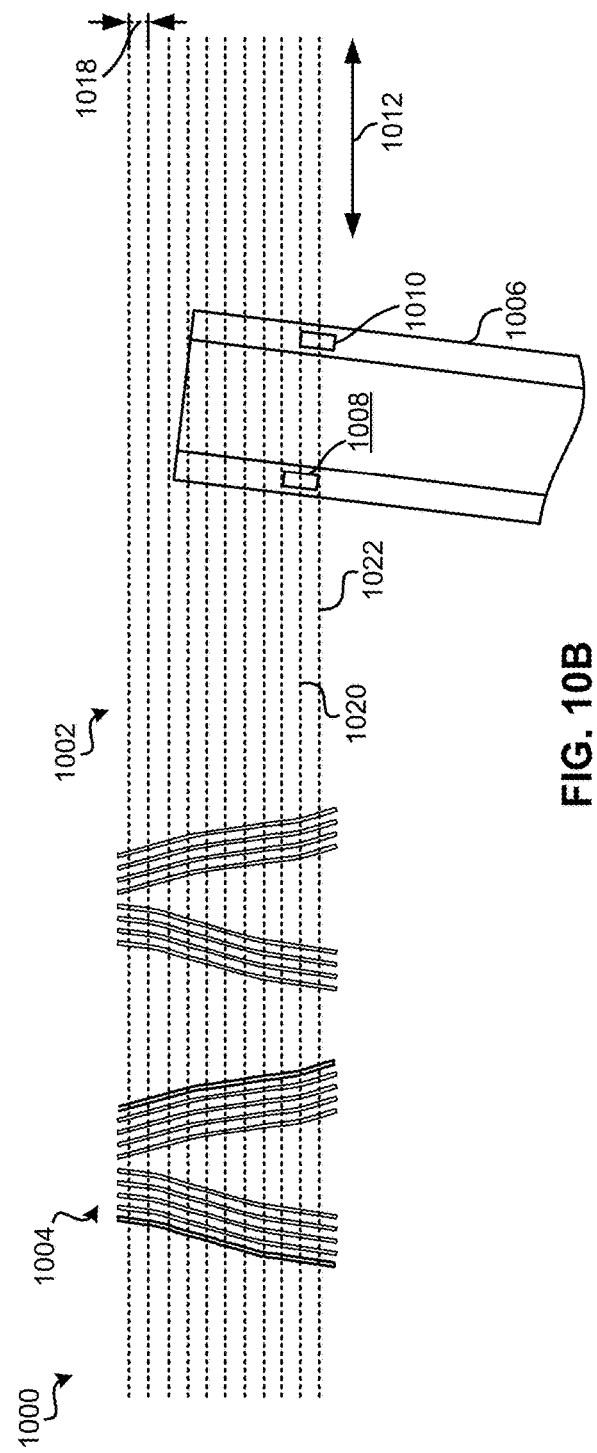
FIG. 10B shows the magnetic tape head of FIG. 10A in an ending y-position relative to the servo pattern in the servo band.

FIG. 10A-10B depict a representation 1000 of starting and ending y-positions of a magnetic tape head relative to a servo pattern in a servo band, e.g., when performing the method of FIG. 9, in accordance with one embodiment. As an option, the present representation 1000 may be implemented in conjunction with features from any other embodiment listed herein, such as those described with reference to the other FIGS. Of course, however, such representation 1000 and others presented herein may be used in various applications and/or in permutations which may or may not be specifically described in the illustrative embodiments listed herein. Further, the representation 1000 presented herein may be used in any desired environment.

Referring first to FIG. 10A, representation 1000 includes a servo band 1002, which includes a TBS pattern 1004 having nonlinear stripes. Moreover, representation 1000 includes a magnetic tape head 1006, having a first reader 1008 and a second reader 1010. The magnetic tape head 1006 is skewed for misaligning the first and second readers 1008, 1010 in a direction perpendicular to a tape travel direction 1012 thereacross by a predefined distance 1018. The skew is preferably static, i.e., remains fixed during the procedure as the head transitions from the position shown in FIG. 10A to that shown in FIG. 10B.

In FIG. 10A, the first reader 1008 is shown positioned at a first y-position 1014 relative to the TBS pattern 1004 in the servo band 1002, and the second reader 1010 is shown positioned at a second y-position 1016 relative to the TBS pattern 1004 in the servo band 1002. In one approach, the first reader 1008 is positioned, e.g., as in operation 904 of FIG. 9, and further operations such as 906 and 908 of FIG. 9 may be performed.

As described elsewhere herein, e.g., see operation 910 of method 900, in one approach, the first reader 1008 is moved to a next y-position for measuring y-positions of the second reader. For example, in one approach, the next y-position corresponds to an average y-position of the second reader during the immediately previous measuring, e.g., position 1016 of FIG. 10A after the first reading operation. According to another approach, the next y-position corresponds to a predefined step size away from the y-position of the first reader during the immediately previous measuring.

Referring now to FIG. 10B, after potentially several operations such as an iteration of operations 910-914 of FIG. 9, the first reader 1008 is shown positioned on a final y-position 1020, and the second reader 1010 is shown positioned on a final y-position 1022. In one approach, the final y-positions 1020, 1022 of the first and second readers 1008, 1010 (respectively) correspond to an end of the servo band 1002 being reached, a predefined y-position, etc. Accordingly, the final y-position 1022 may be the final y-position measured by the second reader.

In one approach, some or all of the y-positions measured by the second reader are averaged, e.g., as in operation 914 of FIG. 9. Accordingly, in one approach, a unique nonlinearity value of the servo pattern in the servo band for each of the average y-position values are calculated using the respective average y-position value. Such unique nonlinearity value of the servo pattern in the servo band may be stored and/or output.

Figure 11B:
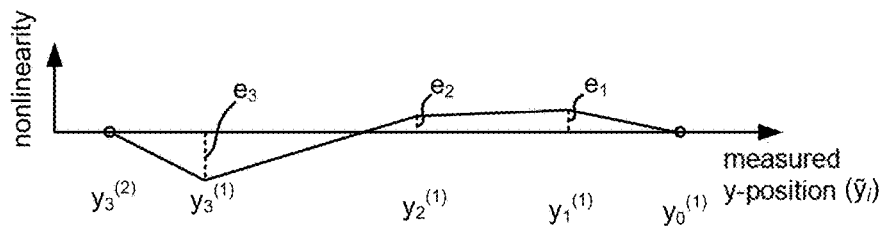
FIG. 11B shows a graph plotting the measured y-positions of FIG. 11A vs. calculated unique nonlinearity values.

FIG. 11A-11B depict graphs 1100, 1150, in accordance with various embodiments. As an option, the present graphs 1100, 1150 may be implemented in conjunction with features from any other embodiment listed herein, such as those described with reference to the other FIGS. Of course, however, such graphs 1100, 1150 and others presented herein may be used in various applications and/or in permutations which may or may not be specifically described in the illustrative embodiments listed herein. Further, the graphs 1100, 1150 presented herein may be used in any desired environment.

Referring now to FIG. 11A, graph 1100 plots average measured y-positions $\tilde{y}_i$, e.g., $y_0^{(1)}$, $y_0^{(2)}$, $y_1^{(2)}$, $y_2^{(2)}$ (where superscript (1) denotes the first reader, (2) denotes the second reader, and the subscript denotes the number of the read operation in a sequence of read operations), and $y_3^{(2)}$ vs. linearized y-positions $y_i$, e.g., $y_0$, $y_1$, $y_2$, $y_3$, $y_4$. For reference, the measured y-position $y_0^{(1)}$ represents the first y-position that the first reader is positioned at relative to a servo pattern in a servo band. Moreover, the measured y-position $y_3^{(2)}$ represents the last average y-position that the second reader measures at. Accordingly, each of the measured y-positions $y_0^{(2)}$, $y_1^{(2)}$, $y_2^{(2)}$ reflect the positions at which the second reader measures the servo pattern, and the first reader follows, while performing the process introduced elsewhere herein, e.g., see operations 910-914 of method 900.

A measured y-position line 1104 connects each of the measured y-positions $\tilde{y}_i$, and an linearized y-position line 1102 connects each of the linearized y-positions $y_i$.

In one approach, based on calculating N number of linearized y-positions $y_i$ of the servo band is calculated based on a first y-position $y_0 = y_0^{(1)}$ and a last y-position, e.g., $y_N = y_{N-1}^{(2)}$, i.e. based on the measured y-positions $y_0^{(1)}$ and $y_{N-1}^{(2)}$. Accordingly, in one approach, the following Equation (2) is used for calculating the linearized y-positions $y_i$:

$$y_i = y_0 - p * i \qquad \text{Equation (2)}$$

where i=0 ... N, and $p=(y_0-y_N)/N$.

Moreover, in one approach, the measured y-positions is determined using the following Equations (3):

$$\tilde{y}_i = y_i^{(1)} \text{ for } 0 \le i < N,$$

$$\tilde{y}_i = y_{N-1}^{(2)} \text{ for } i=N. \qquad \text{Equation (3)}$$

Accordingly, in one approach, calculating a unique nonlinearity value of the servo pattern in the servo band for each of the average y-position values includes calculating a difference between the average y-position values and linearized y-positions. For example, with continued reference to FIG. 11A, in one approach a unique nonlinearity value $e_i$ of the servo pattern in the servo band for each of the average y-position values is calculated using the following Equation (4):

$$e_i = \tilde{y}_i - y_i \text{ for } 0 < i < N, \qquad \text{Equation (4)}$$

0 else.

In other words, as illustrated in FIG. 11A, unique nonlinearity values $e_1$, $e_2$, and $e_3$ illustrate the difference between the average y-position values $y_0^{(2)}$, $y_1^{(2)}$, $y_2^{(2)}$, and the linearized y-positions $y_1$, $y_2$, $y_3$ (respectively).

It should be noted that in one approach, measured y-positions $y_0^{(2)}$, $y_1^{(2)}$, $y_2^{(2)}$ represent y-positions that are traversed by both a first and a second reader of a skewed magnetic tape head when the step size is equal to the lateral offset of the first and second readers (e.g., 1018 of FIG. 10A), and therefore such measured y-positions also include axis labels $y_1^{(1)}$, $y_2^{(1)}$, and $y_3^{(1)}$. Moreover, the measured y-positions $y_0^{(1)}$ may only be traversed by the first reader of the skewed magnetic tape head, and the y-position $y_3^{(2)}$ may only be traversed by the second reader of the skewed magnetic tape head (e.g., see the first y-position 1014 and the final y-position 1022 of FIGS. 10A-10B), and therefore such measured y-positions each only include a single axis label.

In the present approach, a unique nonlinearity value of the servo pattern in the servo band is calculated for each of the average y-position values using different respective average y-position values measured by a second reader of a skewed magnetic tape head. Of course, such respective average y-positions of the second reader relative to the servo pattern in the servo band may be measured while the first reader is at a different y-position, e.g., see the first y-position and/or the next y-position of method 900.

In one approach, where the next y-position corresponds to a predefined step size away from the y-position of the first reader during the immediately previous measuring, the skew applied to the magnetic tape head preferably spaces the first and second readers about an estimated value of p (see Equation 2) apart in a direction perpendicular to a tape travel direction thereacross. In one approach, provided that the skew applied to the magnetic tape head spaces the first and second readers less than or about an estimated value of p apart from each other, the predefined step size is set to be the estimated value of p. Put a different way, the skew applied to the head is preferably chosen such that on average $y_i^{(1)} - y_i^{(2)} \approx p$ or equivalently $\Sigma_{i=0:N-1}(y_i^{(1)} - y_i^{(2)}) = Np$. Accordingly, in one approach, the y-position of the first reader is adjusted to the predefined step size away from the immediately previous measuring in each step sequence.

Referring now to FIG. 11B, graph 1150 depicts the measured y-positions $\tilde{y}_i$, e.g., $y_0^{(1)}$, $y_0^{(2)}$, $y_1^{(2)}$, $y_2^{(2)}$, and $y_3^{(2)}$ vs. the calculated unique nonlinearity value of the servo pattern in the servo band for each of the average y-position values.

Figure 12:
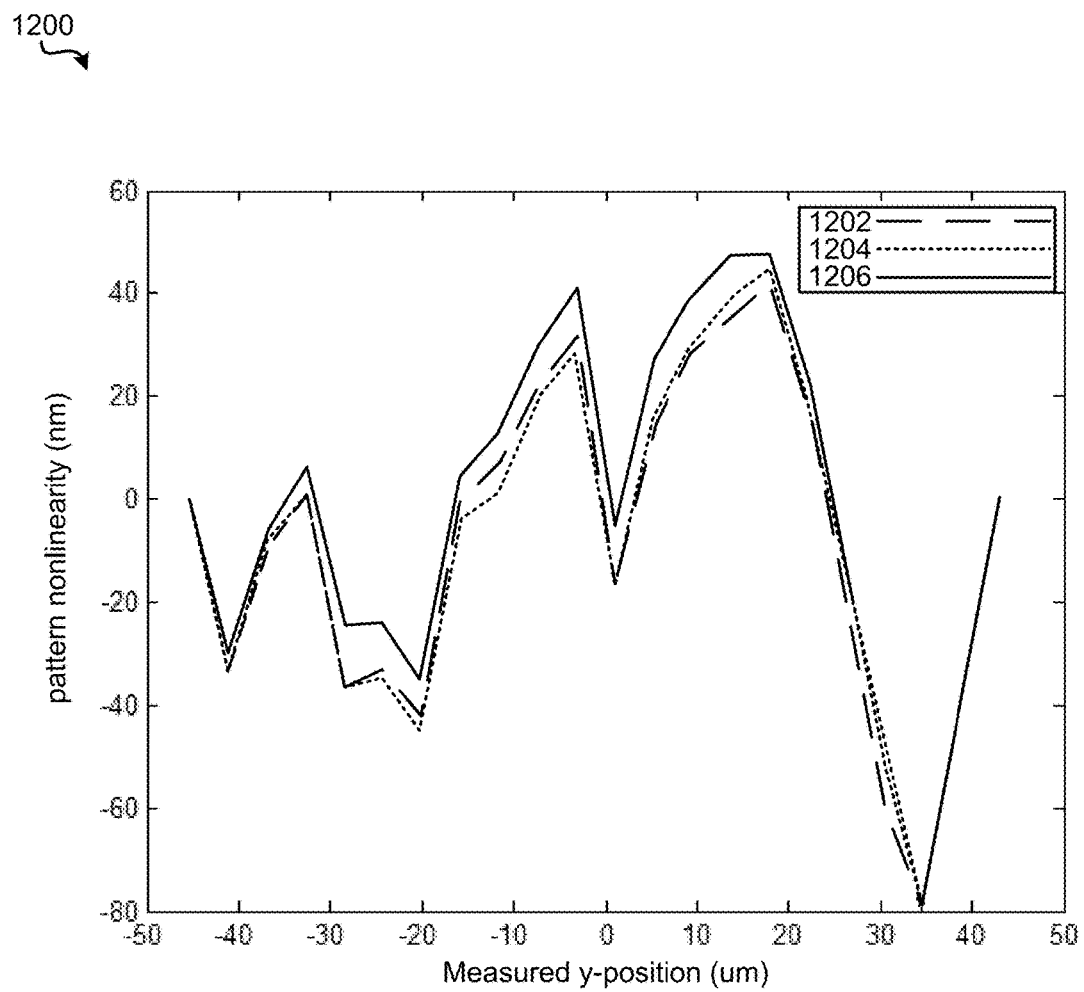
FIG. 12 shows a graph plotting nonlinearities at different y-positions of TBS patterns of a first servo band on a magnetic tape, according to one embodiment.
Figure 13:
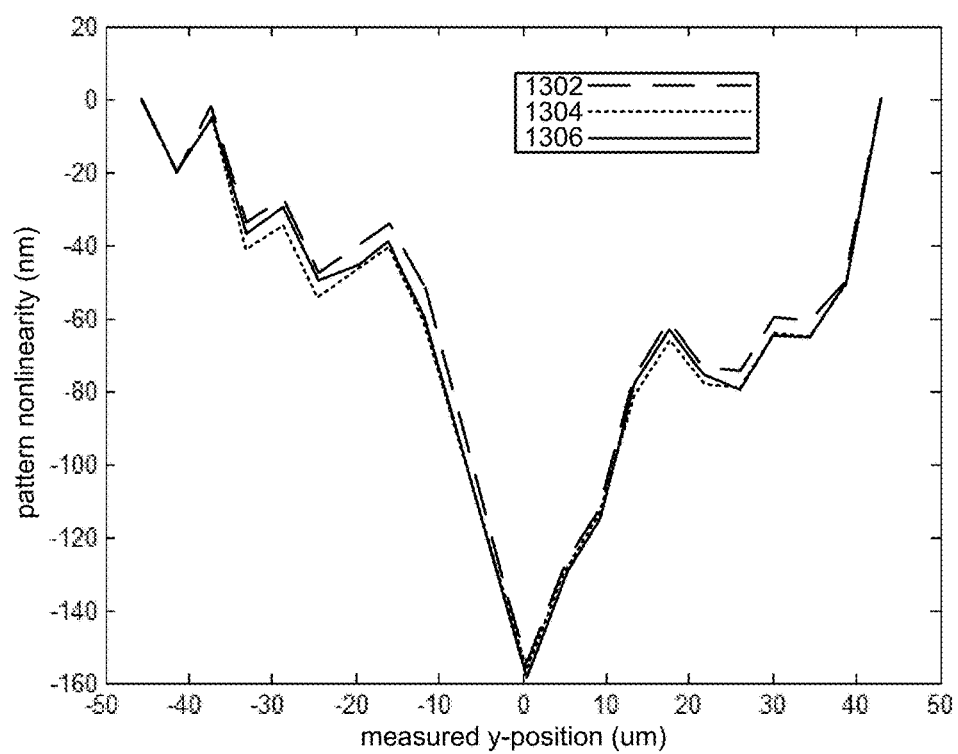
FIG. 13 shows a graph plotting nonlinearities at different y-positions of a second TBS pattern on the same magnetic tape as that of FIG. 12.

FIG. 12-13 include graphs 1200, 1300 which plot measured y-positions vs. unique nonlinearity values of servo patterns in two different servo bands (respectively), in accordance with various embodiments. As an option, the present graphs 1200, 1300 may be implemented in conjunction with features from any other embodiment listed herein, such as those described with reference to the other FIGS. Of course, however, such graphs 1200, 1300 and others presented herein may be used in various applications and/or in permutations which may or may not be specifically described in the illustrative embodiments listed herein. Further, the graphs 1200, 1300 presented herein may be used in any desired environment.

Referring first to FIG. 12, graph 1200 illustrates nonlinearities of TBS patterns in a first servo band on a magnetic tape, which were measured and characterized in experimental testing. Specifically, the graph 1200 includes a measured y-position (nm) vs. pattern nonlinearity (nm) comparison of three different readings, e.g., reflected by nonlinearity profiles 1202, 1204, 1206, performed using operations of method 900, performed at three different points in time. The small differences in the nonlinearity profiles 1202, 1204, 1206 reflect measurement noise and small skew drift. Moreover, it should be noted that in the present approach, the three measurements incorporate all of the servo stripes of the measured servo frames. For example, in the context of the TBS pattern 1004 of FIGS. 10A-10B, all stripes in the A and C bursts are written with the same servo write gap (i.e. a first write gap), so they are expected to have the same nonlinearity. Similarly, all stripes in the B and D burst are written with the same servo write gap (i.e. the second write gap), so they are expected to have the same nonlinearity. Moreover, the first and second write gap are expected to have different nonlinearities, but since the $A_j$ count measurement is between A and B burst stripes (or between C and D burst stripes), only a single pattern nonlinearity is measured.

With continued reference to FIG. 12, in the current approach, due to a lack of having an absolute measurement reference, it may be assumed that a distance between the first measured y-position and the final measured y-position spans 88.31 µm in total, e.g., 43 µm above a servo centerline of the servo band and 45.31 µm below the servo centerline of the servo band. Moreover, anchor points of the measured y-position are designated as residing on a zero of the nonlinearity spectrum, i.e. these anchor point are assumed to have no nonlinearity error. These anchor points are assumed to reside on a linear portion of the servo band.

Accordingly, the first measured y-position may be located about 43 µm above the servo centerline. Moreover, the end of the servo band (45.31 µm below the centerline of the servo band) may be the last measured y-position.

In the current example, the lateral offset distance between a first reader and a second reader (in the direction perpendicular to a tape travel direction thereacross, e.g., 1018 of FIG. 10A) of the magnetic tape head used to measure such y-positions is about 4.205 µm. This distance may also be calculated by dividing the sample distance 88.31 µm by the number times (N) the first reader was moved to a next y-position for measuring different y-positions by the second reader. Here assume that N=21. Accordingly, in the present approach, the distance between each y-position measured by the second reader, and the y-position previously read by the second reader is about 4.205 µm.

For reference, if the stripes of the measured TBS pattern were linear, each of the profiles 1202, 1204, 1206 would not vary from the zero of the plotted nonlinearity (nm). However, in graph 1200, the stripes of the measured TBS pattern in the servo band may be determined to include nonlinearities. In one approach, negative nonlinearity values correspond to the measured servo y-position being lower (in a direction perpendicular to a tape travel direction thereacross) than the y-position would be if the servo stripes written on the magnetic tape had no nonlinearities. In contrast, in another approach, positive nonlinearity values correspond to the measured servo y-position being higher (in a direction perpendicular to a tape travel direction thereacross) than the y-position would be if the servo stripes written on the magnetic tape had no nonlinearities.

For purposes of a further example, referring now to FIG. 13, graph 1300 illustrates nonlinearities of a second TBS pattern on the same magnetic tape as that of FIG. 12. However, it should be noted that the TBS pattern of FIG. 13 resides in a different servo band than the servo band associated with the TBS pattern of FIG. 12, although each of the two servo bands preferably border a common data band.

Graph 1300 illustrates nonlinearities of TBS patterns in a second servo band. Specifically the graph 1300 includes a measured y-position (nm) vs. pattern nonlinearity (nm) comparison of three different readings, e.g., reflected by nonlinearity profiles 1302, 1304, 1306, performed using the same measurement procedure introduced in method 900, performed at three different points in time. In the present approach, each of the nonlinearity profiles 1302, 1304, 1306 include primarily negative nonlinearity values (other than a first y-position and a last average measured y-position which are assumed to be linear and therefore have nonlinearity values of zero). Accordingly, in one approach, the measured y-positions corresponding to the current testing sample of graph 1300 is lower in a servo band (in a direction perpendicular to a tape travel direction thereacross) than the y-positions would otherwise be if written on the magnetic tape without nonlinearities.

For reference, from graph 1300 it can be observed that the greatest degree of nonlinearity exists in the middle of the sampled TBS patterns, e.g., having about a −160 nm characterized pattern nonlinearity. According to various approaches, these characterizations of nonlinearities are stored and thereby available for future reference, such as to be used in compensating for such nonlinearities, e.g., as will be described in greater detail elsewhere herein (see method 1600).

Figure 14:
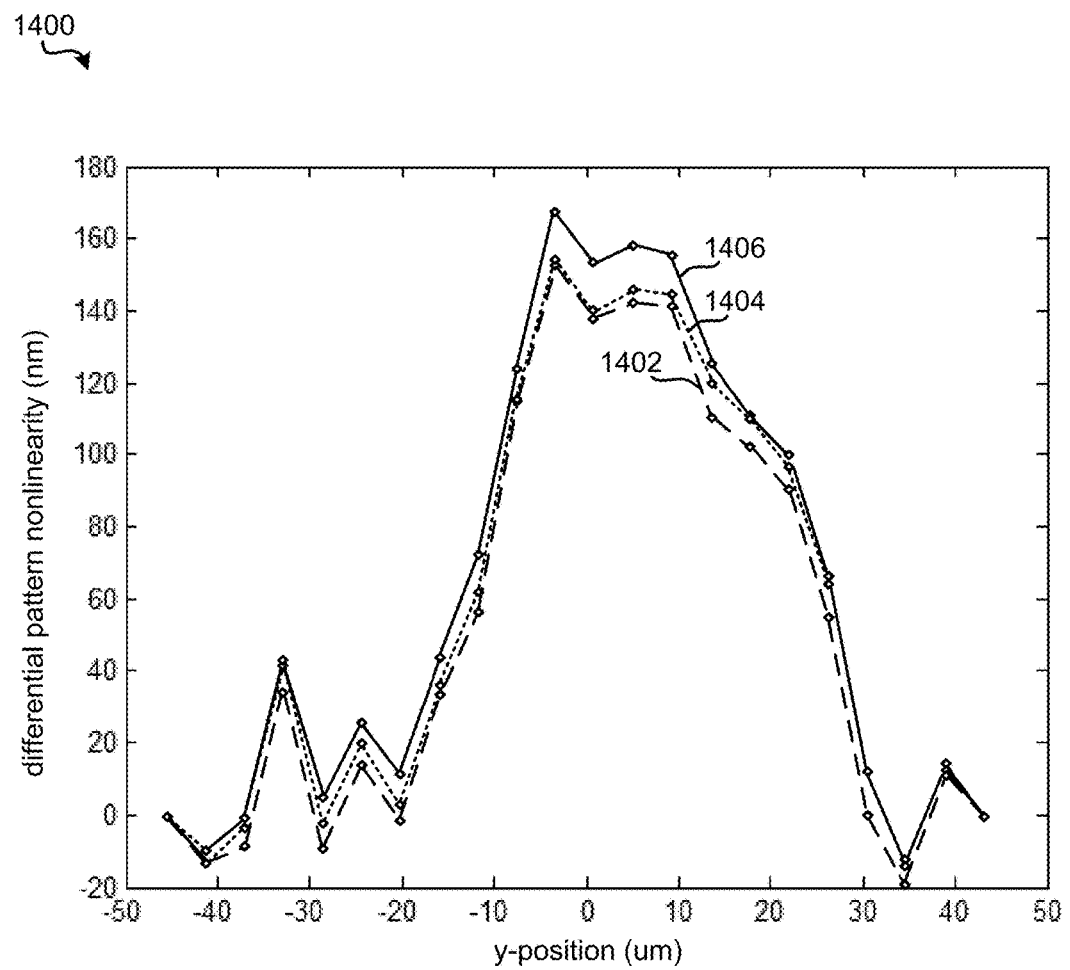
FIG. 14 shows a graph plotting differential pattern nonlinearity between the TBS patterns of the first servo band sampled in FIG. 12 and the TBS patterns of the second servo band sampled in FIG. 13, at different y-positions.
Figure 15A:
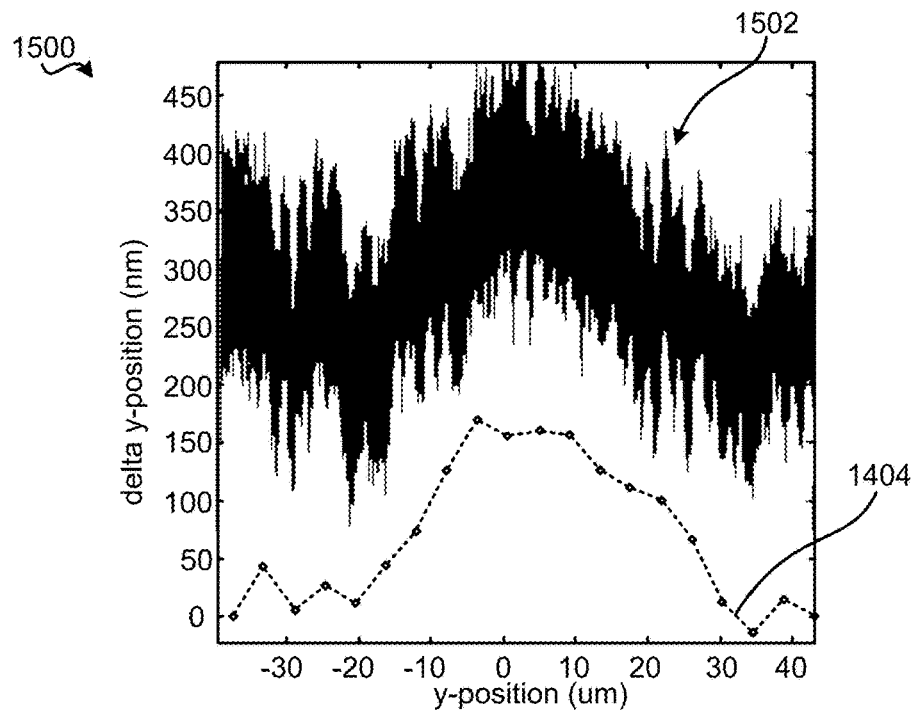
FIG. 15A shows a graph plotting a measured delta y-position between the servo bands sampled FIGS. 12-13, and the differential pattern nonlinearity of FIG. 14.
Figure 15B:
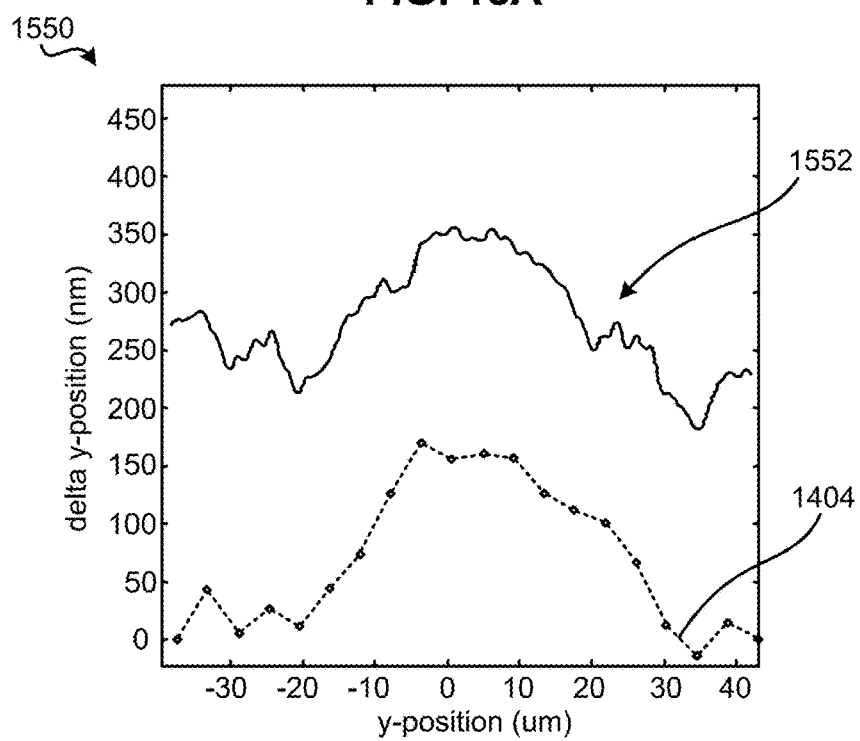
FIG. 15B shows a graph plotting an averaged and smoothed estimate of the delta y-position obtained from five sequential captures, and the differential pattern nonlinearity of FIG. 14.

FIGS. 14-15B include graphs 1400, 1500, 1550 which plot characterizations of nonlinearity, in accordance with various embodiments. As an option, the present graphs 1400, 1500, 1550 may be implemented in conjunction with features from any other embodiment listed herein, such as those described with reference to the other FIGS. Of course, however, such graphs 1400, 1500, 1550 and others presented herein may be used in various applications and/or in permutations which may or may not be specifically described in the illustrative embodiments listed herein. Further, the graphs 1400, 1500, 1550 presented herein may be used in any desired environment.

Referring first to FIG. 14, graph 1400 plots differential pattern nonlinearity between the TBS pattern of the first servo band sampled in FIG. 12 and the TBS pattern of the second servo band sampled in FIG. 13. Specifically, nonlinearity profile 1402 depicts the differential pattern nonlinearity (difference) between the nonlinearity profile 1202 of FIG. 12 and the nonlinearity profile 1302 of FIG. 13. Moreover, nonlinearity profile 1404 depicts the differential pattern nonlinearity (difference) between the nonlinearity profile 1204 of FIG. 12 and the nonlinearity profile 1304 of FIG. 13. Furthermore, nonlinearity profile 1406 depicts the differential pattern nonlinearity (difference) between the nonlinearity profile 1206 of FIG. 12 and the nonlinearity profile 1306 of FIG. 13.

As discussed above, data is recorded in the regions of tape located between pairs of servo bands. In read/write heads of state-of-the-art tape drives, two servo readers are normally available per head module. Servo reader 1 then reads the servo band above the data band, while servo reader 2 simultaneously reads the servo band below the data band.

Assume for purposes of an example that $ypos_1$ and $ypos_2$ are defined as the y-positions measured from servo reader 1 and servo reader 2, respectively. Then the delta y-position may be defined as ($ypos_1$-$ypos_2$), i.e. the difference between the measured y-position of two servo readers which read two servo bands that border a common data band. Referring first to FIG. 15A, graph 1500 plots a measured delta y-position 1502 (deltaSpan) between servo patterns of the two servo bands sampled in FIG. 12 and FIG. 13. The graph 1500 is the result of actuating a tape head module such that the modules servo reads are ramping up and down in the servo bands in a single measurement. As illustrated in FIG. 15A, the delta y-position 1502 is very noisy. This data may be contrasted with the differential pattern nonlinearity 1404 from FIG. 14.

Referring first to FIG. 15B, graph 1550 illustrates the differential pattern nonlinearity 1404 from FIG. 14, and an averaged and smoothed estimate 1552 of the delta y-position obtained from five sequential captures. As illustrated in FIG. 15B, the delta y-position is noisy, although less noisy on average than the delta y-position 1502 of FIG. 15A.

As described above, nonlinearity of features in a servo pattern may cause inaccuracies during reading from and/or writing to magnetic recording media. For example, nonlinearities in TBS patterns on magnetic tape may result in a head position being incorrect. As a result, data tracks may be written to a magnetic tape in the wrong position and/or the resulting inaccurate head position may affect reading accuracy.

Accordingly, in some embodiments, the accuracy by which data is read from and/or written to magnetic recording media may be improved as a result of considering characterizations of such errors while performing read and/or write operations on magnetic recording media that has servo pattern nonlinearities such as nonlinear servo stripes.

As will now be described, various embodiments and/or approaches described herein compensate for and/or mitigate servo pattern nonlinearities by incorporating characterizations of such nonlinearities into nonlinearity compensation techniques.

Figure 16:
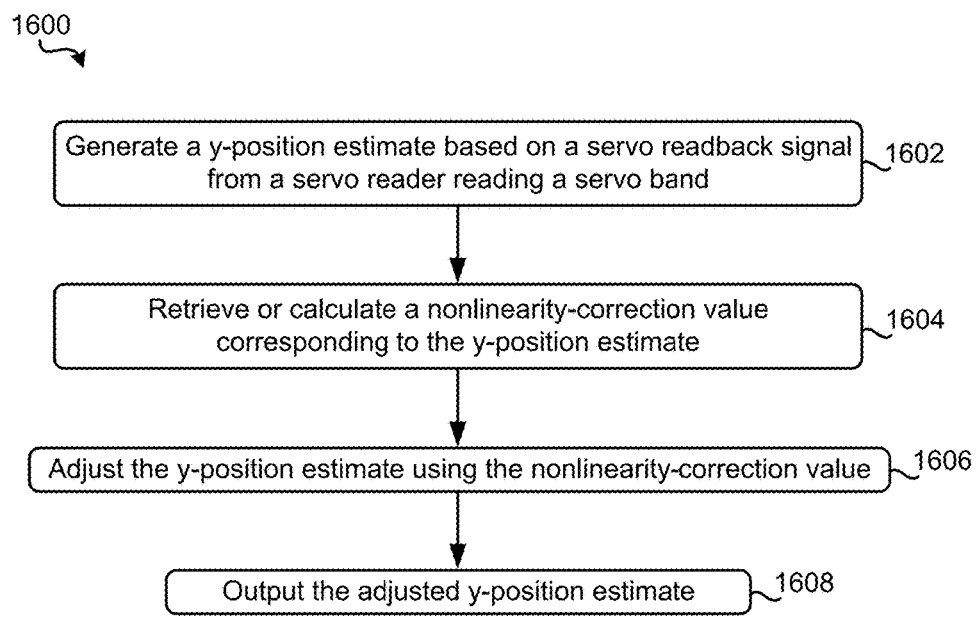
FIG. 16 shows a flowchart of a method, according to one embodiment.

Now referring to FIG. 16, a flowchart of a method 1600 is shown according to one embodiment. The method 1600 may be performed in accordance with the present invention in any of the environments depicted in FIGS. 1-15, among others, in various embodiments. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a drive controller, or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a central processing unit (CPU), an application specific integrated circuit (ASIC), a field programmable gate array (FPGA), etc., combinations thereof, or any other suitable computing device known in the art.

Operation 1602 of method 1600 includes generating a y-position estimate based on a servo readback signal from a servo reader reading a servo pattern in a servo band of a magnetic medium such as a magnetic tape. Any conventional technique may be used to generate the y-position estimate. According to various approaches, the servo readback signal may originate from any type of servo pattern of the servo band. For example, according to some approaches, the servo signal originates from reading a TBS pattern that comprises bursts of servo stripes. According to some other approaches, the servo signal originates from reading an HD servo pattern. In one approach, a servo channel generates the y-position estimate based on a decoding of the servo readback signal. Generation of the y-position estimate may be instantaneous, based on an averaging of a few servo frames, etc.

The generated y-position estimate may (and likely does) include error as a result of nonlinearities in the servo patterns of the servo band. To compensate for this, in operation 1604, a nonlinearity-correction value corresponding to the y-position estimate is retrieved or calculated. According to various approaches, the nonlinearity-correction value corresponding to the y-position estimate may be retrieved or calculated from any one or more locations and/or using any one or more techniques. Exemplary locations and techniques will be described in greater detail elsewhere herein, e.g., see FIGS. 18A-20.

Preferably, the nonlinearity-correction value is retrieved or calculated based on pre-calculated nonlinearity values created for the specific magnetic medium currently being operated on, e.g., as described above. Such nonlinearity values may be retrieved from any source. Illustrative sources include memory, e.g., magnetic tape cartridge memory or library memory; retrieved from data stored on the medium, e.g., such as data in a header portion or the like; from a magnetic tape library memory depending on the media type or number; etc.

Operation 1606 of method 1600 includes adjusting the y-position estimate using the nonlinearity-correction value to compensate for the servo pattern nonlinearity at or near the estimated y-position. For example, in one approach, the y-position estimate is adjusted in a direction perpendicular or substantially perpendicular to the intended direction of magnetic tape travel.

By adjusting y-position estimates using the nonlinearity-correction values to compensate for servo pattern nonlinearities, data writing and/or reading events performed on a magnetic recording medium are more accurate, e.g., because the correction applied to the y-position estimates simulate the result of reading linear servo features. As a result, data readback from the magnetic recording medium will become more efficient, e.g., in having to perform less data error correction processes. Accordingly, the amount of processing that would otherwise be performed by a computer, e.g., tape drive and/or any components of a computer such as a tape drive controller, performing method 1600 is reduced. Moreover, the accuracy of data writing is improved due to the more accurate track positioning afforded hereby, which in turn results in improved readability of the data tracks.

In operation 1608, the adjusted y-position estimate is output. According to a more specific approach, the adjusted y-position estimate is output for use by a track-following servo controller. According to various further approaches, the adjusted y-position estimate may additionally and/or alternatively be output to be used by any one or more other control loops. For example, in one approach, the adjusted y-position estimate is output for use by a head-to-tape skew controller.

Accordingly, in one approach, method 1600 includes using the adjusted y-position estimate for adjusting a head position of a magnetic tape head during reading and/or writing. In such an approach, rather than using the raw y-position estimate, the difference between the adjusted y-position estimate and a target y-position may be used to generate a head position-error signal (PES) that can be used by a track-following servo controller to adjust the head position, e.g., by controlling a head actuator.

Figure 17:
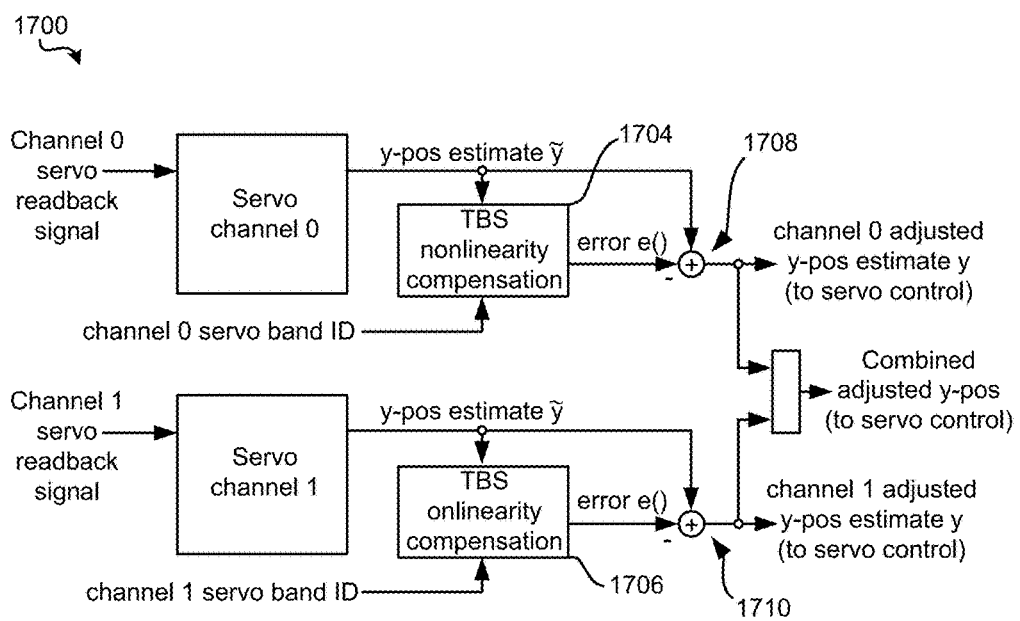
FIG. 17 shows a diagram of a logical architecture in which the nonlinearity of two servo readback signals from two servo channels are compensated for, according to one embodiment.

FIG. 17 includes an architecture 1700 for implementing nonlinearity compensation into two y-position estimates for creating a more accurate average y-position estimate, in accordance with one embodiment. As an option, the present architecture 1700 may be implemented in conjunction with features from any other embodiment listed herein, such as those described with reference to the other FIGS. Of course, however, such architecture 1700 and others presented herein may be used in various applications and/or in permutations which may or may not be specifically described in the illustrative embodiments listed herein. Further, the architecture 1700 presented herein may be used in any desired environment.

FIG. 17 illustrates the architecture 1700 of a drive having dual servo channels, e.g., Servo channel 0 and Servo channel 1. In one approach, a first y-position estimate (y-position estimates ŷ) is generated by a servo channel (Servo channel 0) based on a servo readback signal (Channel 0 servo readback signal) from a servo reader reading a first servo band. Moreover, a second y-position estimate (y-position estimates ŷ) is generated by a second servo channel (Servo channel 1) based on a second servo readback signal (Channel 1 servo readback signal) from a second servo reader reading a second servo band.

It should be noted that although the present approach includes two servo channels, any number of servo channels of a magnetic medium may be considered when characterizing and/or compensating for nonlinearity in servo patterns. Considering multiple servo channels of a magnetic medium when compensating for nonlinearities of servo patterns of the magnetic medium may enable even greater improved accuracies during reading and/or writing operations, because servo pattern nonlinearity may be different in different servo bands. For example, the nonlinearities in the servo patterns of different servo bands may be different in terms of severity and/or shape, different at different relative positions of the servo pattern, different in terms of the type of nonlinearity, etc.

A first nonlinearity-correction value is retrieved or calculated for use in compensating for error of the first y-position estimate, e.g., see y-position estimate ŷ logical path passing through nonlinearity compensation block 1704. Moreover, a second nonlinearity-correction value is retrieved or calculated for use in compensating for error of the second y-position estimate, e.g., see y-position estimate ŷ logical path passing through nonlinearity compensation block 1706. The nonlinearity compensation blocks 1704, 1706 may use the servo band ID of the servo band being read to determine the proper values to use, e.g., see channel 0 servo band ID and channel 1 servo band ID.

Accordingly, the first and second y-position estimates ŷ may be adjusted, e.g., see logic 1708, 1710, using the nonlinearity-correction values.

Moreover, the first and second adjusted y-position estimates may be output. For example, the first and second adjusted y-position estimates (channel 0 adjusted y-pos estimate y and channel 1 adjusted y-pos estimate y) are shown being output to a servo controller.

As depicted in architecture 1700, the first and second adjusted y-position estimates may be combined. In one approach, the combined adjusted y-position is used by a track following controller (servo control) of the drive to adjust head position relative to the magnetic medium.

With joint reference now to FIG. 17 and operation 1604 of method 16, it should be noted that the nonlinearity-correction values corresponding to the first and second y-position estimates may be retrieved from any one or more locations and/or calculated using any one or more techniques. For example, in the present approach, the nonlinearity-correction values corresponding to the first and second y-position estimates are shown in FIG. 17 being retrieved based on knowing the servo band ID of the servo band being read, e.g., see channel 0 servo band ID and channel 1 servo band ID. Moreover, such y-position estimates may be retrieved from any one or more other locations and/or calculated using any one or more other techniques, e.g., as will now be described with reference to FIGS. 18A-20.

FIGS. 18A-20 include architectures 1800, 1900, 2000 of implementing nonlinearity compensation into at least one y-position estimate based on a servo readback signal, in accordance with various embodiments. As an option, the present architectures 1800, 1900, 2000 may be implemented in conjunction with features from any other embodiment listed herein, such as those described with reference to the other FIGS. Of course, however, such architectures 1800, 1900, 2000 and others presented herein may be used in various applications and/or in permutations which may or may not be specifically described in the illustrative embodiments listed herein. Further, the architectures 1800, 1900, 2000 presented herein may be used in any desired environment.

Figure 18A:
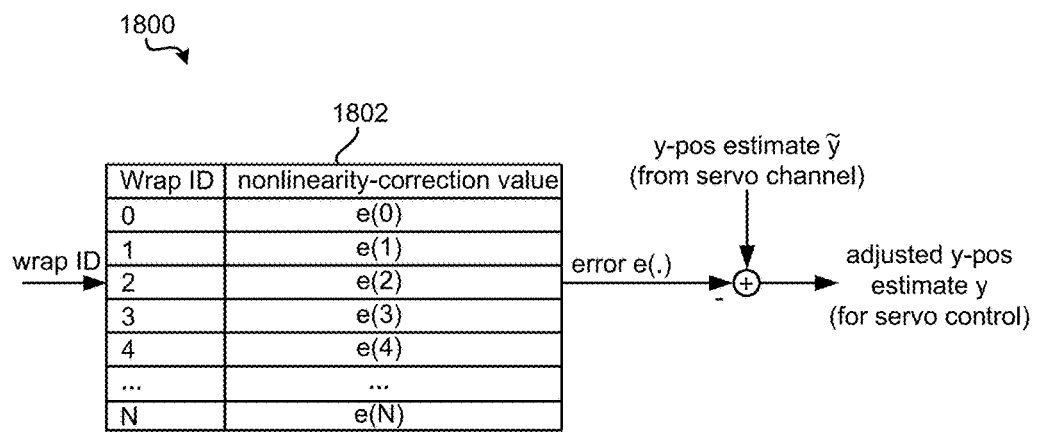
FIG. 18A shows a logical diagram in which a nonlinearity-correction value is retrieved from a table of nonlinearity-correction values, according to one embodiment.

Referring first to FIG. 18A, architecture 1800 illustrates an embodiment in which a nonlinearity-correction value is retrieved from a table 1802 for adjusting a y-position estimate.

According to various approaches, the table 1802 may include a plurality of nonlinearity-correction values corresponding to known locations relative to the servo band. For example, in one approach, at least one of the nonlinearity-correction values may correspond to pre-defined locations on the medium. For example, each of the pre-defined wrap locations may correspond to an associated wrap ID, where the wrap ID corresponds to a predefined lateral position within the associated servo band. Accordingly, it may be assumed that in architecture 1800, the associated servo band ID may be determined.

Referring again to FIG. 18A, implementation of a table for storing and/or accessing a plurality of nonlinearity-correction values corresponding to known locations relative to the servo band may provide a low-cost approach to be used for retrieving a nonlinearity-correction value corresponding to the y-position estimate.

Figure 18B:
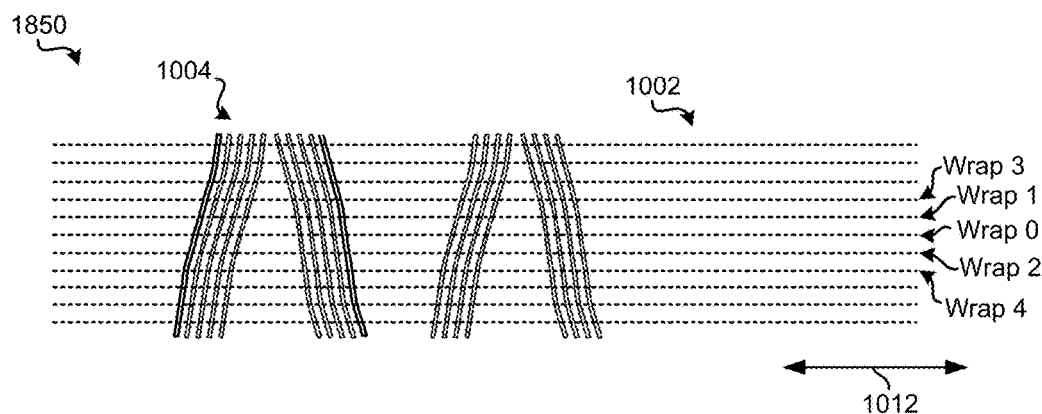
FIG. 18B shows a representation of a servo band having a servo pattern with nonlinearities that are characterized as nonlinearity-correction values in the table of FIG. 18A.

In FIG. 18B, various wrap IDs of a servo band are shown for purposes of an example. Representation 1850 includes a servo band 1002, which includes a TBS pattern 1004 having nonlinear stripes. Moreover, the servo band 1002 is divided into a plurality of different known locations, e.g., a plurality of wraps. For example, in one approach, the wrap IDs 0, 1, 2, 3, 4, listed in the table 1802 of FIG. 18A correspond to the wraps Wrap 0, Wrap 1, Wrap 2, Wrap 3, Wrap 4 of the servo band 1002 (respectively). Wrap locations within a servo band, wrap layout, etc. may be predefined, may correspond to a format for which the magnetic medium is compatible, etc.

Returning to FIG. 18A, the nonlinearity-correction value corresponding to the y-position estimate is retrieved from the table 1802, and may be subtracted from (or equivalently, added to) the y-position estimate to obtain a more accurate (actual) y-position of a magnetic head. The resulting adjusted y-position estimate may be used for head positioning.

Figure 19:
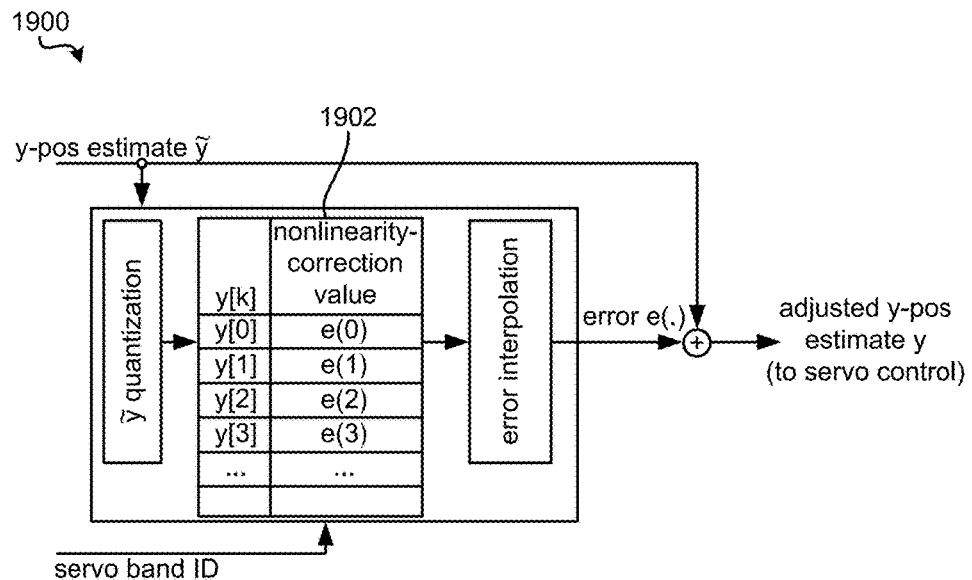
FIG. 19 shows a logical diagram in which a nonlinearity-correction value is calculated for a y-position estimate using interpolation, according to one embodiment.

Referring now to FIG. 19, in some approaches, nonlinearity-correction values are known for a certain discrete number of y-position estimates, however, it may be useful, e.g., for increased reading and/or writing accuracies, to calculate nonlinearity-correction values for additional y-position estimates (that are not one of the known y-position estimates) without performing further read operations on the servo band. For example, in architecture 1900, nonlinearity-correction values, e.g., e(0)-e(3), may be known for a discrete number of y-position estimates $\tilde{y}$, e.g., y[k]; where k=0-3.

Accordingly, to calculate a nonlinearity-correction value for a y-position estimate that is not one of the known y-position estimates, one or more nonlinearity-correction values corresponding to the known locations in a vicinity of the estimated y-position may be interpolated using techniques that would become apparent to one skilled in the art upon reading the present description. According to various approaches, the interpolation may incorporate any number of known locations in a vicinity of the estimated y-position, e.g., in a known look-up-table 1902. In a preferred approach, the interpolation incorporates at least a known location that is closest to the estimated y-position, in the known look-up-table 1902. It should be noted that where multiple servo bands are incorporated into such interpolation(s), more than one look-up-table may be accessed.

In another approach, the nonlinearity-correction value is calculated by interpolation using nonlinearity-correction values corresponding to known locations relative to the servo band, e.g., known in the look-up-table 1902. For example, assume that an estimated y-position y[0.5] does not have a known nonlinearity-correction value, but the estimated y-position y[0.5] exists between wrap 0 and wrap 1 in the servo band. Also assume that wrap 0 and wrap 1 are associated with y-position estimates y[0] and y[1] in the look-up-table 1902 (respectively). Because the nonlinearity-correction values e(0) and e(1) are known in the look-up-table 1902, the unknown nonlinearity-correction value of the y-position estimate y[0.5] may be linearly interpolated using the nonlinearity-correction values e(0) and e(1).

It should be noted that any interpolation performed in the present approaches may incorporate known interpolation mathematical techniques, e.g., linear interpolation techniques, second or third-order interpolation techniques, n-order interpolation techniques incorporating any order of nonlinearity-correction values that correspond to other y-positions, etc.

As illustrated in architecture 1900, after calculating (using interpolation) a nonlinearity-correction value for the y-position estimate, an adjusted y-position estimate may be calculated by subtracting the calculated nonlinearity-correction value from the y-position estimate.

Figure 20:
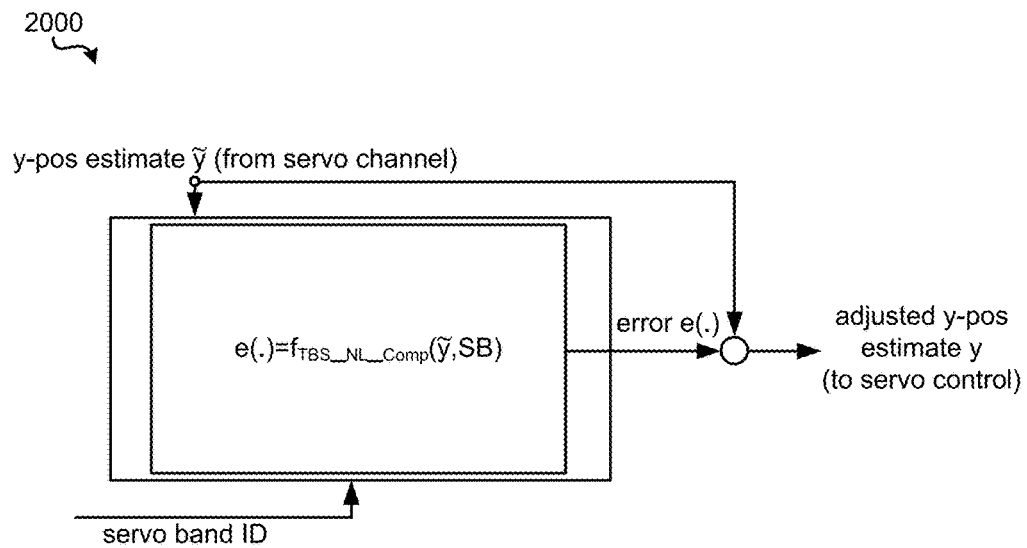
FIG. 20 shows a logical diagram in which a nonlinearity-correction value is calculated for a y-position estimate using a formula, according to one embodiment.

Referring now to FIG. 20, in some approaches, a nonlinearity-correction value may be calculated using a function for directly computing the nonlinearity-correction value as a function of the y-position estimate. As an example, the function shown in FIG. 20 is: $e(\cdot)=f_{TBS\_NL\_Comp}(\tilde{y},SB)$, where $e(\cdot)$ is the nonlinearity-correction value as a function of the y-position estimate $\tilde{y}$ for a given servo band SB.

In various approaches, variables of the function for directly computing the nonlinearity-correction value as a function of the y-position estimate may be different for different servo bands and/or servo band IDs. Moreover, the type of the function utilized for directly computing the nonlinearity-correction value as a function of the y-position estimate may be different for different servo bands and/or servo band IDs. In one approach the function is a polynomial function. In another approach the function is a B-spline function. In yet another approach the function is a Bezier function. In such approaches, the mathematics utilized to create such functions may be of known techniques.

Moreover, where more than one nonlinearity-correction value is being calculated, e.g., see FIG. 17, the various functions used may be the same or different. For example, with joint reference now to FIG. 17 and FIG. 20, the second nonlinearity-correction value may be calculated using a second function for directly computing the nonlinearity-correction value as a function of the second y-position estimate, while the first nonlinearity-correction value is calculated using a different function for directly computing the nonlinearity-correction value as a function of the first y-position estimate.

Figure 21A:
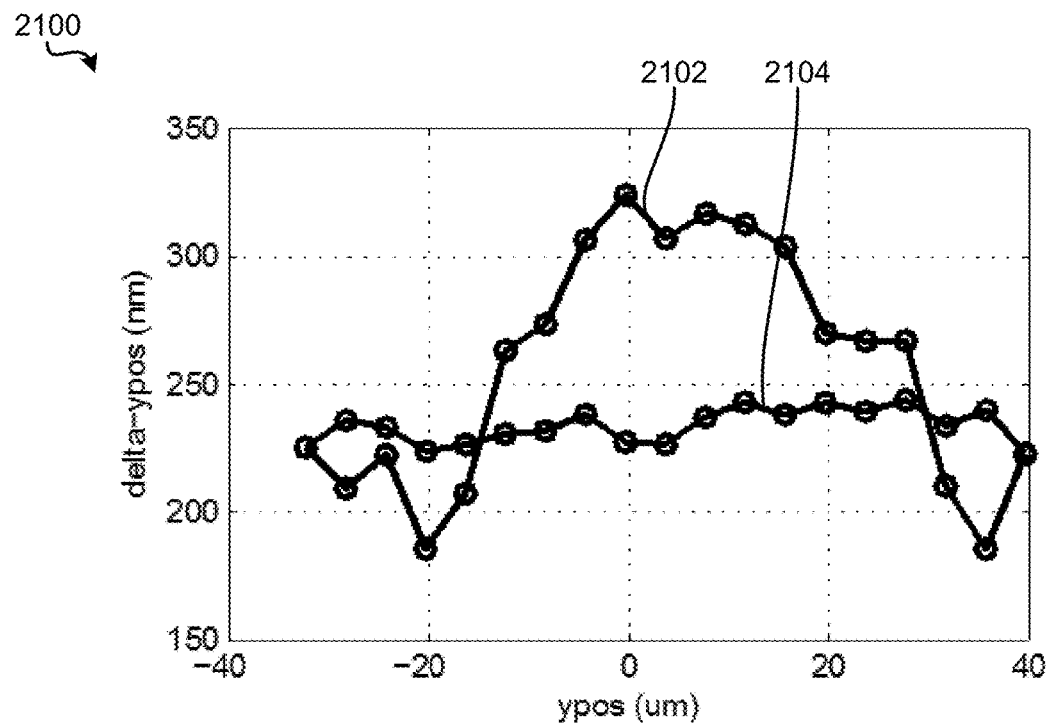
FIG. 21A is a graph plotting measurements for two different servo bands read by servo readers while using nonlinearity compensation and while not using nonlinearity compensation, according to one embodiment.
Figure 21B:
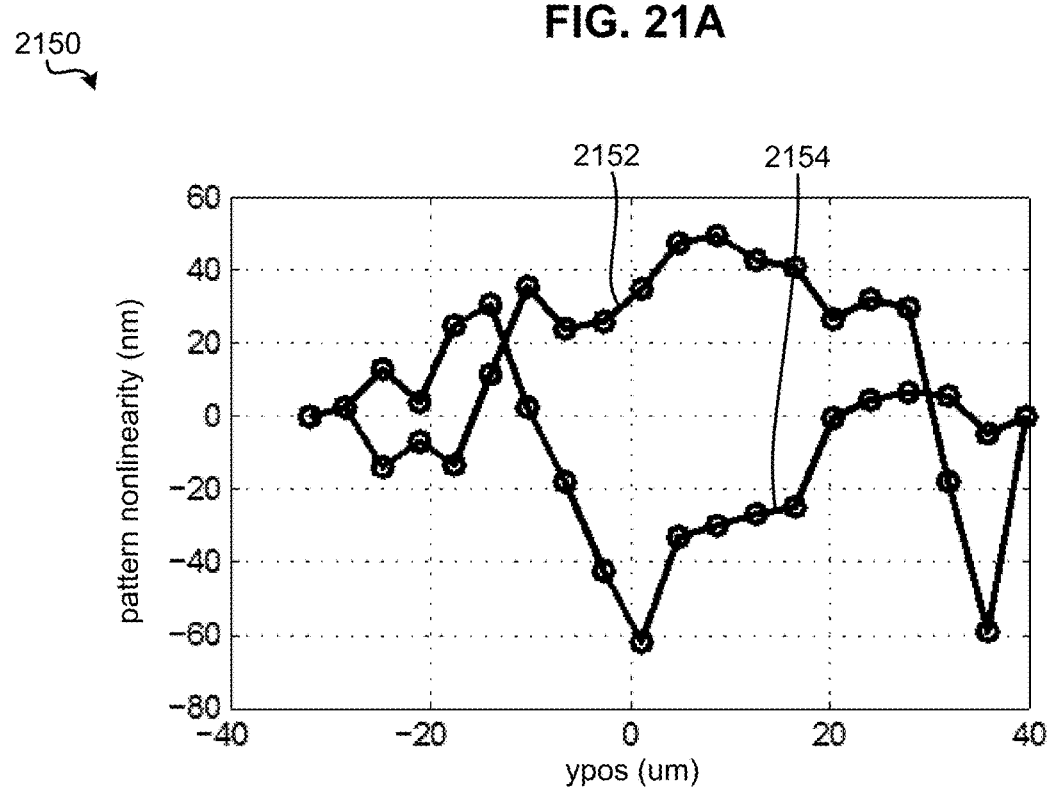
FIG. 21B is a graph plotting servo pattern nonlinearity in the two measured servo bands of FIG. 21A, according to one embodiment.

FIGS. 21A-21B include graphs 2100, 2150 plotting measurements for two different servo bands read by servo readers while using nonlinearity compensation vs while not using nonlinearity compensation, in accordance with various embodiments. As an option, the present graphs 2100, 2150 may be implemented in conjunction with features from any other embodiment listed herein, such as those described with reference to the other FIGS. Of course, however, such graphs 2100, 2150 and others presented herein may be used in various applications and/or in permutations which may or may not be specifically described in the illustrative embodiments listed herein. Further, the graphs 2100, 2150 presented herein may be used in any desired environment.

Referring first to FIG. 21A, graph 2100 includes a plot of measurements taken by a first reader on a first servo band minus measurements taken by a second reader on a second servo band, e.g., delta-ypos=(ypos1-ypos2). A first linear profile 2102 connects delta-y-positions that were obtained without using nonlinearity compensation techniques of various embodiments and/or approaches described elsewhere herein. Moreover, a second linear profile 2104 connects delta-y-positions that were obtained using nonlinearity compensation techniques of various embodiments and/or approaches described elsewhere herein.

In graph 2100, it can be seen that by using compensation techniques described herein, e.g., see method 1600, when reading and/or wiring from a servo band having nonlinear servo patterns, the reading and/or writing events will include significantly less resulting errors.

Referring now to FIG. 21B, graphs 2150 includes a plot of the servo pattern nonlinearity in each of the servo bands measured in FIG. 21A, e.g., prior to plotting a delta of the two measurements. The first linear profile 2152 corresponds to y-positions read from the first servo band, while the second linear profile 2154 corresponds to y-positions read from the second servo band.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   generating a y-position estimate based on a servo readback signal from a servo reader reading a servo band;
   retrieving or calculating a nonlinearity-correction value corresponding to the y-position estimate;
   adjusting the y-position estimate using the nonlinearity-correction value; and
   outputting the adjusted y-position estimate.

2. The method as recited in claim 1, wherein the nonlinearity-correction value is retrieved from a table.

3. The method as recited in claim 2, wherein the table includes a plurality of nonlinearity-correction values corresponding to known locations relative to the servo band.

4. The method as recited in claim 1, wherein the nonlinearity-correction value is retrieved from a source selected from the group consisting of: a magnetic tape cartridge memory, data stored on a magnetic tape, and a magnetic tape library memory.

5. The method as recited in claim 1, wherein the nonlinearity-correction value corresponding to the y-position estimate is calculated by interpolation of nonlinearity-correction values corresponding to known locations in a vicinity of the estimated y-position.

6. The method as recited in claim 1, wherein the nonlinearity-correction value is calculated using a function for directly computing the nonlinearity-correction value as a function of the y-position estimate.

7. The method as recited in claim 1, comprising:
   generating a second y-position estimate based on a second servo readback signal from a second servo reader reading a second servo band;
   retrieving or calculating a second nonlinearity-correction value corresponding to the second y-position estimate;
   adjusting the second y-position estimate using the nonlinearity-correction value;
   outputting the adjusted second y-position estimate; and
   combining the adjusted y-position estimate and the adjusted second y-position estimate.

8. The method as recited in claim 7, wherein the nonlinearity-correction value is calculated using a function for directly computing the nonlinearity-correction value as a function of the y-position estimate, wherein the second nonlinearity-correction value is calculated using a second function for directly computing the nonlinearity-correction value as a function of the second y-position estimate, wherein the function and second functions are different.

9. The method as recited in claim 1, comprising: using the adjusted y-position estimate for adjusting a head position of a magnetic tape head thereafter reading the servo band.

10. A computer program product for compensating for nonlinearity in a timing based servo pattern, the computer program product comprising a computer readable storage medium having program instructions embodied therewith, wherein the computer readable storage medium is not a transitory signal per se, the program instructions readable and/or executable by a controller to cause the controller to perform a method comprising:
    generating, by the controller, a y-position estimate based on a servo readback signal from a servo reader reading a servo band;
    retrieving or calculating, by the controller, a nonlinearity-correction value corresponding to the y-position estimate;
    adjusting, by the controller, the y-position estimate using the nonlinearity-correction value; and
    outputting, by the controller, the adjusted y-position estimate.

11. The computer program product as recited in claim 10, wherein the nonlinearity-correction value is retrieved from a table.

12. The computer program product as recited in claim 11, wherein the table includes a plurality of nonlinearity-correction values corresponding to known locations relative to the servo band.

13. The computer program product as recited in claim 10, wherein the nonlinearity-correction value is retrieved from a source selected from the group consisting of: a magnetic tape cartridge memory, data stored on a magnetic tape, and a magnetic tape library memory.

14. The computer program product as recited in claim 10, wherein the nonlinearity-correction value is calculated by interpolation using nonlinearity-correction values corresponding to known locations relative to the servo band.

15. The computer program product as recited in claim 10, wherein the nonlinearity-correction value is calculated using a function for directly computing the nonlinearity-correction value as a function of the y-position estimate.

16. The computer program product as recited in claim 10,
    generating a second y-position estimate based on a second servo readback signal from a second servo reader reading a second servo band;
    retrieving or calculating a second nonlinearity-correction value corresponding to the second y-position estimate;
    adjusting the second y-position estimate using the nonlinearity-correction value;
    outputting the adjusted second y-position estimate; and
    combining the adjusted y-position estimate and the adjusted second y-position estimate.

17. The computer program product as recited in claim 16, wherein the nonlinearity-correction value is calculated using a function for directly computing the nonlinearity-correction value as a function of the y-position estimate, wherein the second nonlinearity-correction value is calculated using a second function for directly computing the nonlinearity-correction value as a function of the second y-position estimate, wherein the function and second functions are different.

18. The computer program product as recited in claim 10, comprising: using the adjusted y-position estimate for adjusting a head position of a magnetic tape head thereafter reading the servo band.

19. An apparatus, comprising:
a controller configured to:
generate a y-position estimate based on a servo readback signal from a servo reader reading a servo band;
retrieve or calculate a nonlinearity-correction value corresponding to the y-position estimate;
adjust the y-position estimate using the nonlinearity-correction value; and
output the adjusted y-position estimate.

20. The apparatus as recited in claim 19, wherein the nonlinearity-correction value is calculated by interpolation using nonlinearity-correction values corresponding to known locations relative to the servo band.

* * * * *